(12) United States Patent
Suzuki et al.

(10) Patent No.: US 9,145,961 B2
(45) Date of Patent: Sep. 29, 2015

(54) VEHICLE DRIVE SYSTEM

(75) Inventors: Takabumi Suzuki, Saitama (JP); Yoshio Akiba, Saitama (JP); Keiichi Ooiso, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 145 days.

(21) Appl. No.: 13/823,067

(22) PCT Filed: Jun. 15, 2011

(86) PCT No.: PCT/JP2011/063739
§ 371 (c)(1),
(2), (4) Date: Mar. 13, 2013

(87) PCT Pub. No.: WO2012/042983
PCT Pub. Date: Apr. 5, 2012

(65) Prior Publication Data
US 2013/0178320 A1    Jul. 11, 2013

(30) Foreign Application Priority Data
Sep. 30, 2010    (JP) ................. 2010-222850

(51) Int. Cl.
*B60K 1/02*    (2006.01)
*F16H 37/06*    (2006.01)
(Continued)

(52) U.S. Cl.
CPC .............. *F16H 37/065* (2013.01); *B60K 6/448* (2013.01); *B60K 6/52* (2013.01); *B60K 7/0007* (2013.01);
(Continued)

(58) Field of Classification Search
CPC .......... B60K 1/02; B60K 6/26; B60K 7/0007; B60K 7/043; B60K 7/165; B60K 2007/0092

USPC .............. 180/65.6, 65.51, 65.7, 297, 62, 292; 477/3; 475/5
See application file for complete search history.

(56) References Cited

U.S. PATENT DOCUMENTS 1,858,506 A * 5/1932 Jacobs ......................... 180/65.6
2,876,657 A * 3/1959 Allin, Sr. et al. ................ 475/29
(Continued)

FOREIGN PATENT DOCUMENTS

DE    100 63 167 A1    6/2002
JP    05-116542 A    5/1993
(Continued)

OTHER PUBLICATIONS

Extended European Search Report dated May 13, 2014, issued in corresponding European Patent Application No. 11828544.4 (5 pages).
(Continued)

*Primary Examiner* — J. Allen Shriver, II
*Assistant Examiner* — Emma K Frick
(74) *Attorney, Agent, or Firm* — Westerman, Hattori, Daniels & Adrian, LLP

(57) ABSTRACT

Two motor and planetary gear type speed reducers are disposed sequentially from an outer side in a width direction of a vehicle, whereby the speed reducers are disposed between the motors. A radially outer edge of a ring gear of one of the speed reducers is formed smaller than the smaller one of the two radially outermost edge portions of the motors. An offset space that is recessed further radially than an imaginary line that connects the radially outermost edge portion of one motor with the that of the other motor is provided radially outwards of the ring gear of one of the speed reducers, and at least part of a breather chamber of a breather unit and at least part of a strainer accommodation compartment are disposed within the offset space. It is thus possible to expand a volumetric capacity room that communicates with an interior of a case.

23 Claims, 12 Drawing Sheets

(51) Int. Cl.

| | | |
|---|---|---|
| *B60K 6/448* | (2007.10) | |
| *B60K 6/52* | (2007.10) | |
| *B60K 7/00* | (2006.01) | |
| *B60K 17/04* | (2006.01) | |
| *B60L 11/12* | (2006.01) | |
| *B60L 11/14* | (2006.01) | |
| *B60L 1/00* | (2006.01) | |
| *B60L 3/00* | (2006.01) | |
| *B60L 7/12* | (2006.01) | |
| *B60K 17/16* | (2006.01) | |
| *B60K 17/356* | (2006.01) | |
| *F16H 1/28* | (2006.01) | |

(52) U.S. Cl.
CPC ............... *B60K 17/046* (2013.01); *B60L 1/003* (2013.01); *B60L 3/0061* (2013.01); *B60L 7/12* (2013.01); *B60L 11/123* (2013.01); *B60L 11/14* (2013.01); *B60K 1/02* (2013.01); *B60K 17/165* (2013.01); *B60K 17/356* (2013.01); *B60K 2007/0046* (2013.01); *B60K 2007/0092* (2013.01); *B60L 2220/46* (2013.01); *B60L 2240/36* (2013.01); *F16H 2001/2881* (2013.01); *Y02T 10/6217* (2013.01); *Y02T 10/6243* (2013.01); *Y02T 10/6265* (2013.01); *Y02T 10/646* (2013.01); *Y02T 10/7077* (2013.01); *Y02T 90/16* (2013.01); *Y10T 74/19014* (2015.01); *Y10T 74/19219* (2015.01)

(56) References Cited

U.S. PATENT DOCUMENTS

| | | | | |
|---|---|---|---|---|
| 5,372,213 A | * | 12/1994 | Hasebe et al. | 180/65.6 |
| 5,396,968 A | * | 3/1995 | Hasebe et al. | 180/65.6 |
| 5,419,406 A | * | 5/1995 | Kawamoto et al. | 180/65.6 |
| 5,528,094 A | * | 6/1996 | Hasebe et al. | 310/112 |
| 5,845,546 A | * | 12/1998 | Knowles et al. | 74/650 |
| 6,022,287 A | * | 2/2000 | Klemen et al. | 475/5 |
| 6,321,865 B1 | * | 11/2001 | Kuribayashi et al. | 180/243 |
| 6,327,935 B1 | * | 12/2001 | Joslin et al. | 74/650 |
| 6,398,685 B1 | * | 6/2002 | Wachauer et al. | 475/149 |
| 6,749,532 B2 | * | 6/2004 | Wachauer | 475/5 |
| 6,964,311 B2 | * | 11/2005 | Yang | 180/65.1 |
| 7,084,539 B2 | * | 8/2006 | Forster | 310/91 |
| 7,112,155 B2 | * | 9/2006 | Keuth | 475/6 |
| 7,276,005 B2 | * | 10/2007 | Morikawa | 475/5 |
| 7,819,214 B2 | * | 10/2010 | Mizutani et al. | 180/65.51 |
| 8,469,848 B2 | * | 6/2013 | Ono et al. | 475/5 |
| 8,585,525 B2 | * | 11/2013 | Ushiroda et al. | 475/151 |
| 8,641,568 B2 | * | 2/2014 | Knoblauch et al. | 475/150 |
| 8,678,118 B2 | * | 3/2014 | Takenaka et al. | 180/65.6 |
| 2002/0092687 A1 | | 7/2002 | Forster | |
| 2003/0098204 A1 | | 5/2003 | Mogi | |

FOREIGN PATENT DOCUMENTS

| | | |
|---|---|---|
| JP | 05-262142 A | 10/1993 |
| JP | 11-170881 A | 6/1999 |
| JP | 11-240347 A | 9/1999 |
| JP | 3007471 B2 | 11/1999 |
| JP | 2002-302394 A | 10/2002 |
| JP | 2003-161363 A | 6/2003 |

OTHER PUBLICATIONS

Chinese Office Action; Chinese Patent Application No. 201180041423.2 issued Apr. 2, 2014.

* cited by examiner

VEHICLE DRIVE SYSTEM

CROSS-REFERENCED TO RELATED APPLICATIONS

This application is a National Stage entry of International Application PCT/JP2011/063739 filed Jun. 15, 2011, which claims priority of Japanese Patent Application No. 2010-222850 filed Sep. 30, 2010, the disclosure of these prior applications are hereby incorporated in their entirety by reference.

TECHNICAL FIELD

The present invention relates to a vehicle drive system that includes a motor for driving wheels, a speed changer that is provided on a power transmission line between the motor and the wheels and a case for accommodating the motor and the speed changer.

BACKGROUND ART

Patent Literature 1 discloses a vehicle drive system in which a motor and a speed changer are provided on each of left- and right-hand sides of the system and an oil passage for oil that cools the motors is formed vertically above a case that accommodates both the motors and both the speed changers.

On the other hand, Patent Literature 2 discloses a vehicle drive system in which a volumetric capacity room of a breather unit that communicates with both a motor case that accommodates a motor and a speed changer case that accommodates a speed changer is formed above a joint portion between the cases.

PRIOR ART LITERATURE

Patent Literature

Patent Literature 1: JP-H05-116542-A
Patent Literature 2: JP-2003-161363-A

SUMMARY OF THE INVENTION

Problem that the Invention is to Solve

In the vehicle drive system described in Patent Literature 1, however, the oil passage is formed outside the case that accommodates the motors, whereby the system is enlarged in size as a whole by the oil passage. In addition, in this vehicle drive system, nothing is described on a breather unit, and should a volumetric capacity room for the breather unit be disposed in this vehicle drive system, there are fears that the system is enlarged in size in a radial direction.

Although the volumetric capacity room of the breather unit is disclosed in Patent Literature 2, there is room for improvement with respect to a size set for and where to dispose the volumetric capacity room.

The invention has been made in view of these situations and an object thereof is to provide a vehicle drive system that enables the enlargement of a volumetric capacity room that communicates with an interior of a case.

Means for Solving the Problem

To attain the object, Claim 1 defines a vehicle drive system (e.g., a rear-wheel drive system 1 in embodiment) including:

a motor (e.g., motors 2A, 2B in embodiment) that drives a wheel (e.g., rear wheels LWr, RWr in embodiment);

a speed changer (e.g., planetary gear type speed reducers 12A, 12B in embodiment) that is provided on a power transmission line between the motor and the wheel; and a case (e.g., a case 11 in embodiment) that accommodates the motor and the speed changer, wherein the motor includes a first and second motors (e.g., motors 2A, 2B in embodiment) that are disposed left and right in a width direction of a vehicle, wherein the speed changer includes a first and second speed changers (e.g., planetary gear type speed reducers 12A, 12B in embodiment) that are disposed left and right in the width direction of the vehicle, wherein the first motor and the first speed changer are disposed sequentially in this order from an outer side in the width direction of the vehicle, and the second motor and the second speed changer are disposed sequentially in this order from an outer side in the width direction of the vehicle, whereby the first and second speed changers are disposed between the first and second motors, wherein at least part of a radially outer edge of a rotational element (e.g., a ring gear 24A in embodiment) of the first speed changer or a radially outer edge of a rotational element (e.g., a ring gear 24B in embodiment) of the second speed changer is formed smaller than a smaller one of a radially outermost edge portion (e.g., a radially outermost edge portion P1 in embodiment) of the first motor and a radially outermost edge portion (e.g., a radially outermost edge portion P2 in embodiment) of the second motor, wherein an offset space (e.g., an offset space OS in embodiment) that is recessed further radially than an imaginary line (e.g., an imaginary line PL in embodiment) that connects the radially outermost edge portion of the first motor with the radially outermost edge portion of the second motor is provided radially outwards of the rotational element of the first speed changer or the rotational element of the second speed changer, and wherein at least part of a volumetric capacity room that communicates with an interior of the case is disposed within the offset space.

Claim 2 defines, based on Claim 1, the system, further including:

a breather unit (e.g., a breather unit 40 in embodiment) that establishes a communication between the interior and an exterior of the case, wherein the volumetric capacity room includes a breather chamber (e.g., a breather chamber 41 in embodiment) that makes up the breather unit and which restrains a liquid fluid that is used to lubricate and/or cool at least one of the motor and the power transmission line by circulating within the case from flowing out to the outside thereof.

Claim 3 defines, based on Claim 2, the system, wherein the breather chamber is formed so as to include at least a space above a vertically uppermost portion of the rotational element of the first speed changer or the rotational element of the second speed changer.

Claim 4 defines, based on Claim 3, the system, wherein the breather unit has further an external communication path (e.g., an external communication path 49 in embodiment) that establishes a communication between the breather chamber and an exterior thereof, and wherein the external communication path is connected to a vertical upper surface of the breather chamber.

Claim 5 defines, based on Claim 4, the system, wherein a breather chamber side end portion (e.g., a breather chamber side end portion 49a in embodiment) of the external communication path is disposed so as to be directed vertically downwards.

Claim 6 defines, based on Claim 1, the system, wherein the first motor drives a left wheel (e.g., a left rear wheel LWr in embodiment) and the second motor drives a right wheel (e.g., a right rear wheel RWr in embodiment), wherein the case has a first case (e.g., a first case 11L in embodiment) that accommodates the first motor and the first speed changer and which has a left reservoir portion (e.g., a left reservoir portion RL in embodiment) that reserves a liquid fluid that is used to lubricate and/or cool at least one of the first motor and the power transmission line and a second case (e.g., a second case 11R in embodiment) that accommodates the second motor and the second speed changer line and which has a right reservoir portion (e.g., a right reservoir portion RR in embodiment) that reserves a liquid fluid that is used to lubricate and/or cool at least one of the second motor and the power transmission line, and wherein the volumetric capacity room includes a central volumetric capacity room (e.g., a strainer accommodation compartment 86 in embodiment) that makes up a lateral communication path (e.g., a lateral communication path FP in embodiment) that establishes a communication between the left reservoir portion and the right reservoir portion.

Claim 7 defines, based on Claim 6, the system, wherein the central volumetric capacity room is formed so as to include a space below a vertical lowermost portion of the rotational element of the first speed changer or the second speed changer.

Claim 8 defines, based on Claim 6 or 7, the system, wherein an inlet port (e.g., an inlet port of a strainer 71 in embodiment) of a liquid fluid supply unit that is used to supply the liquid fluid is disposed in the central volumetric capacity room.

Claim 9 defines, based on Claim 1, the system, further including:

a breather unit (e.g., a breather unit 40 in embodiment) that establishes a communication between the interior and an exterior of the case, wherein the first motor drives a left wheel (e.g., a left rear wheel LWr in embodiment) and the second motor drives a right wheel (e.g., a right rear wheel RWr in embodiment), wherein the case has a first case (e.g., a first case 11L in embodiment) that accommodates the first motor and the first speed changer and which has a left reservoir portion (e.g., a left reservoir portion RL in embodiment) that reserves a liquid fluid that is used to lubricate and/or cool at least one of the first motor and the power transmission line and a second case (e.g., a second case 11R in embodiment) that accommodates the second motor and the second speed changer and which has a right reservoir portion (e.g., a right reservoir portion RR in embodiment) that reserves a liquid fluid that is used to lubricate and/or cool at least one of the second motor and the power transmission line, wherein the volumetric capacity room includes a breather chamber (e.g., a breather chamber 41 in embodiment) that makes up the breather unit and which restrains a liquid fluid within the case from flowing out to the outside thereof and a central volumetric capacity room (e.g., a strainer accommodation compartment 86 in embodiment) that makes up a lateral communication path (e.g., a lateral communication path FP in embodiment) that establishes a communication between the left reservoir portion and the right reservoir portion, and wherein the breather chamber and the central volumetric capacity room that are disposed within the offset space are situated on the same circumference.

Claim 10 defines, based on any one of claims 1 to 9, the system, wherein the first and second motors and the first and second speed changers are disposed coaxially.

Claim 11 defines, based on any one of claims 1 to 10, the system, further including:

a connection/disconnection unit (e.g., a hydraulic brake 60 in embodiment) that is provided on the power transmission line between the motor and the wheel and which puts a motor side and a wheel side in a connected state or a disconnected state by being applied or released, wherein the first and second speed changers are each made up of three rotational elements (e.g., sun gears 21A, 21B, planetary carriers 23A, 23B, ring gears 24A, 24B in embodiment), wherein first rotational elements (e.g., the ring gears 24A, 24B in embodiment) of the three rotational elements of the first and second speed changers are coupled to each other, wherein the connection/disconnection unit is provided on the first rotational element that is coupled thereto, and wherein at least part of the connection/disconnection unit is disposed within the offset space.

Claim 12 defines, based on Claim 11, the system, wherein at least part of the connection/disconnection unit is disposed near to one speed changer (e.g., a planetary gear type speed reducer 12B in embodiment) of the first and second speed changers within the offset space, and wherein at least part of the volumetric capacity room is disposed near to the other speed changer (e.g., a planetary gear type speed reducer 12A in embodiment) of the first and second speed changers within the offset space.

Claim 13 defines, based on Claim 11 or 12, the system, wherein the first and second speed changers are planetary gear type speed changers (e.g., planetary gear type speed reducers 12A, 12B in embodiment) which are each made up of the three rotational elements, wherein the motor is connected to second rotational elements (e.g., sun gears 21A, 21B in embodiment), and wherein the wheel is connected to third rotational elements (e.g., planetary carriers 23A, 23B in embodiment).

Claim 14 defines, based on Claim 13, the system, wherein in the planetary gear type speed changers, the first rotational elements are made up of ring gears, the second rotational elements are made up of sun gears, and the third rotational elements are made up of carriers.

Claim 15 defines, based on Claim 14, the system, wherein the carriers each support a double pinion (e.g., planetary gears 22A, 22B in embodiment) that is made up of a large-diameter pinion (e.g., first pinions 26A, 26B in embodiment) that meshes with the sun gear and a small-diameter pinion (e.g., second pinions 27A, 27B in embodiment) that is smaller in diameter than the large-diameter pinion and which meshes with the ring gear, and wherein the connection/disconnection unit is disposed radially outwards of the ring gear.

Claim 16 defines, based on Claim 14 or 15, the system, wherein the connection/disconnection unit has a fixed plate (e.g., fixed plates 35 in embodiment) that is fixed to the case and a rotational plate (e.g., rotational plates 36 in embodiment) that is fixed to the ring gear so as to rotate together with the ring gear, whereby the ring gear is fixed to the case or the ring gear is released from the case by frictionally engaging or releasing both the plates with or from each other.

Claim 17 defines, based on any one of claims 11 to 16, the system, further including:

a one-way power-transmitting unit (e.g., a one-way clutch 50 in embodiment) that is provided in parallel with the connection/disconnection unit and which is configured so that the one-way power-transmitting unit is put in an engaged state when a forward rotational power on the motor side is inputted into the wheel side and is put in a disengaged state when a backward rotational power on the motor side is inputted into the wheel side, while the one-way power-transmitting unit is put in the disengaged state when a forward rotational power on the wheel side is inputted into the motor side and is put in the engaged state when a backward rotational power on the wheel side is inputted into the motor side, wherein the one-way power-transmitting unit is disposed on the first rotational elements coupled thereto.

Claim 18 defines, based on any one of claims 1 to 10, the system, further including:

a one-way power-transmitting unit (e.g., a one-way clutch 50 in embodiment) that is configured so that the one-way power-transmitting unit is put in an engaged state when a forward rotational power on a motor side is inputted into a wheel side and is put in a disengaged state when a backward rotational power on the motor side is inputted into the wheel side, while the one-way power-transmitting unit is put in the disengaged state when a forward rotational power on the wheel side is inputted into the motor side and is put in the engaged state when a backward rotational power on the wheel side is inputted into the motor side, wherein the first and second speed changers are each made up of three rotational elements (e.g., sun gears 21A, 21B, planetary carriers 23A, 23B, ring gears 24A, 24B in embodiment), wherein first rotational elements (e.g., the ring gears 24A, 24B in embodiment) of the three rotational elements of the first and second speed changers are coupled to each other, wherein the one-way power-transmitting unit is disposed on the first rotational elements coupled thereto, and wherein at least part of the one-way power-transmitting unit is disposed within the offset space.

Claim 19 defines, based on Claim 18, the system, wherein at least part of the one-way power-transmitting unit is disposed near to one speed changer (e.g., a planetary gear type speed reducer 12B in embodiment) of the first and second speed changers within the offset space, and wherein at least part of the volumetric capacity room is disposed near to the other speed changer (e.g., a planetary gear type speed reducer 12A in embodiment) of the first and second speed changers within the offset space.

Claim 20 defines, based on Claim 18 or 19, the system, wherein the first and second speed changers are planetary gear type speed changers (e.g., planetary gear type speed reducers 12A, 12B in embodiment) which are each made up of the three rotational elements, wherein the motor is connected to second rotational elements (e.g., sun gears 21A, 21B in embodiment), and wherein the wheel is connected to third rotational elements (e.g., planetary carriers 23A, 23B in embodiment).

Claim 21 defines, based on Claim 20, the system, wherein in the planetary gear type speed changers, the first rotational elements are made up of ring gears, the second rotational elements are made up of sun gears, and the third rotational elements are made up of carriers.

Claim 22 defines, based on Claim 21, the system, wherein the carriers each support a double pinion (e.g., planetary gears 22A, 22B in embodiment) that is made up of a large-diameter pinion (e.g., first pinions 26A, 26B in embodiment) that meshes with the sun gear and a small-diameter pinion (e.g., second pinions 27A, 27B in embodiment) that is smaller in diameter than the large-diameter pinion and which meshes with the ring gear, and wherein the one-way power-transmitting unit is disposed radially outwards of the ring gear.

Advantage of the Invention

According to Claim 1, by disposing the first and second speed changers that are disposed left and right between the first and second motors that are disposed left and right, it is possible to commonize the lubrication, cooling and operation switching of the first and second speed changers. In addition, by disposing the volumetric capacity room by making use of the offset space provided by forming at least part of the radially outer edge of the rotational element of the first speed changer or the radially outer edge of the rotational element of the second speed changer smaller than the smaller one of the radially outermost edge portion of the first motor and the radially outermost edge portion of the second motor, it is possible to make the volumetric capacity room larger in size. Additionally, when the capacity of the volumetric capacity room is not changed, it is possible to make the drive system smaller in size by suppressing the radial expansion of the case itself.

According to Claim 2, since the volumetric capacity room includes the breather chamber that makes up the breather unit, it is possible to increase the capacity of the breather chamber by making use of the offset space. Additionally, when the capacity of the volumetric capacity room is not changed, it is possible to make the drive system smaller in size by suppressing the radial expansion of the case itself.

According to Claim 3, since normally, the radially outer edge of the rotational element of the speed changer is circular in shape, the offset space is formed into a cylindrical shape. Then, by forming the breather chamber so as to include the space lying above the vertical uppermost portion of the rotational element within the offset space, it is possible to suppress the intrusion of liquid fluid into the volumetric capacity room.

According to Claim 4, by connecting the external communication path to the vertical upper surface of the volumetric capacity room, it is possible to suppress the discharge of liquid fluid to the outside by way of the external communication path.

According to Claim 5, by directing the breather chamber side end portion of the external communication path downwards, it is possible to suppress the discharge of liquid fluid to the outside more effectively.

According to Claim 6, since the volumetric capacity room includes the central volumetric capacity room that makes up the lateral communication path, it is possible to increase the capacity of the central volumetric capacity room by making use of the offset space. Additionally, when the capacity of the central volumetric capacity room is not changed, it is possible to make the drive system smaller in size by suppressing the radial expansion of the case itself.

According to Claim 7, since the central volumetric capacity room is formed so as to include the space below the vertical lowermost portion of the rotational element, it is possible to ensure the flow rate of liquid fluid in the lateral communication path that establishes a communication between the left reservoir portion and the right reservoir portion.

According to Claim 8, since the inlet port of the liquid fluid supply unit is disposed in the central volumetric capacity room of the lateral communication path whose capacity is ensured, it is possible to increase the degree of freedom in disposing the inlet port. Additionally, the fluid level of the central volumetric capacity room of the lateral communication path is stabler than those of the left reservoir portion and the right reservoir portion, and therefore, it is possible to suppress the suction of air into the liquid fluid supply unit.

According to Claim 9, the volumetric capacity room includes the breather chamber that makes up the breather unit and the central volumetric capacity room that makes up the lateral communication path, the breather chamber and the central volumetric capacity room being disposed within the offset space on the same circumference. Therefore, it is possible to increase the capacities of the breather chamber and the central volumetric capacity room by making effective use of the offset space. In addition, when the capacities of the breather chamber and the central volumetric capacity room are not changed, it is possible to make the drive system smaller in size by suppressing the radial expansion of the case itself.

According to Claim 10, by disposing coaxially the four elements of the first and second motors that are disposed left and right and the first and second speed changers that are disposed left and right, the drive system can be made into the substantially cylindrical shape, thereby making it possible to increase the vehicle installation properties of the drive system.

According to Claim 11, by coupling together the one rotational element of the rotational elements and the one rotational element of the rotational elements of the first and second speed changers that are disposed left and right and providing the connection/disconnection unit thereat, it is possible to reduce the number of components involved. Additionally, by disposing at least part of the connection/disconnection unit within the offset space, it is possible to make the drive system (the case) smaller in size in the radial direction.

According to Claim 12, by disposing at least par of the connection/disconnection unit at one side within the offset space and disposing at least part of the volumetric capacity room at the other side within the offset space, it is possible to make the disposition of the connection/disconnection unit compatible with the expansion of the volumetric capacity room.

According to Claim 13, by configuring the first and second speed changers as the planetary gear type speed changers, it is possible to make the speed changer smaller in size. In addition, of the three rotational elements of the speed changer, the connection/disconnection unit is disposed on the rotational element to which the motor and the wheel are not connected, and therefore, it is possible to increase the degree of freedom in disposing the connection/disconnection unit.

According to Claim 14, by connecting the connection/disconnection unit to the ring gear that is the circumferentially outermost element of the planetary gear type speed changer and which lies close to the case of the drive system, it is possible to increase the degree of freedom in placing the connection/disconnection unit.

According to Claim 15, since the planetary gear that is supported by the carrier is configured as the double pinion, it is possible to make the ring gear that meshes with the planetary gear (the small-diameter pinion) smaller in diameter, whereby the offset space defined radially outwards of the ring gear is expanded accordingly. Then, by disposing the connection/disconnection unit in the offset space so expanded, it is possible to make the drive system (the case) smaller in size in the radial direction.

According to Claim 16, by causing the connection/disconnection unit to be applied through frictional engagement of both the plates, it is possible to make the connection/disconnection unit simple in configuration, and it is possible to easily adjust the application force of the connection/disconnection unit by adjusting the number of plates or the contact surface areas of the plates.

According to Claim 17, in the event that the one-way power-transmitting unit is provided parallel to the brake, for example, when a forward rotational power on the motor side is inputted into the wheel side, putting the one-way power-transmitting unit in the engaged state, it becomes possible to transmit power by the one-way power-transmitting unit, thereby making it possible to release the connection/disconnection unit or to weaken the application force.

According to Claim 18, by coupling together the one rotational element of the rotational elements and the one rotational element of the rotational elements of the first and second speed changers that are disposed left and right and providing the one-way power-transmitting unit thereat, it is possible to reduce the number of components involved. Additionally, by disposing at least part of the one-way power-transmitting unit within the offset space, it is possible to make the drive system (the case) smaller in size in the radial direction.

According to Claim 19, by disposing at least par of the one-way power-transmitting unit at one side within the offset space and disposing at least part of the volumetric capacity room at the other side within the offset space, it is possible to make the disposition of the one-way power-transmitting unit compatible with the expansion of the volumetric capacity room.

According to Claim 20, by configuring the first and second speed changers as the planetary gear type speed changers, it is possible to make the speed changer smaller in size. In addition, of the three rotational elements of the speed changer, the one-way power-transmitting unit is disposed on the rotational element to which the motor and the wheel are not connected, and therefore, it is possible to increase the degree of freedom in disposing the one-way power-transmitting unit.

According to Claim 21, by connecting the one-way power-transmitting unit to the ring gears that are the circumferentially outermost elements of the planetary gear type speed changers and which lie close to the case of the drive system, it is possible to increase the degree of freedom in placing the one-way power-transmitting unit.

According to Claim 22, since the planetary gear that is supported by the carrier is configured as the double pinion, it is possible to make the ring gear that meshes with the planetary gear (the small-diameter pinion) smaller in diameter, whereby the offset space defined radially outwards of the ring gear is expanded accordingly. Then, by disposing the one-way power-transmitting unit in the offset space so expanded, it is possible to make the drive system (the case) smaller in size in the radial direction.

MODE FOR CARRYING OUT THE INVENTION

Figure 1:
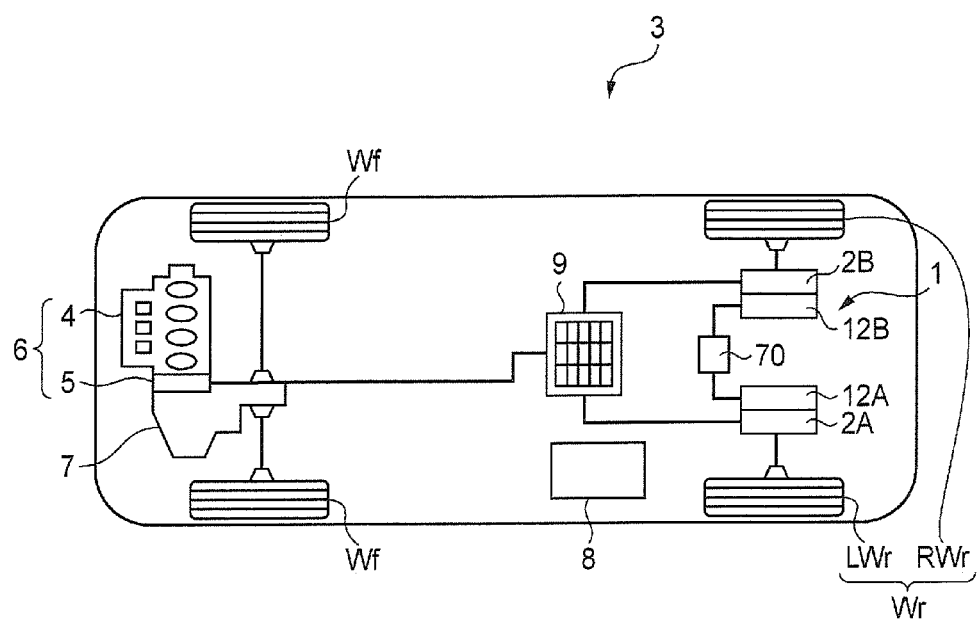
FIG. 1 a block diagram showing a schematic configuration of a hybrid vehicle that constitutes one embodiment of a vehicle in which a vehicle drive system according the invention can be installed.

A vehicle drive system according to the invention is used in a vehicle in which a motor is configured as a drive source for driving wheels, for example, a vehicle employing a drive system as shown in FIG. 1. In the following description, the vehicle drive system will be described as being used as a rear-wheel drive system. However, the vehicle drive system of the invention may be used for a front-wheel drive system.

A vehicle 3 shown in FIG. 1 is a hybrid vehicle having a drive system 6 (hereinafter, referred to as a front-wheel drive system) in which an internal combustion engine 4 and a motor 5 are connected in series at a front part of the vehicle. Power of this front-wheel drive system 6 is transmitted to front wheels Wf via a transmission 7, while power of a drive system 1 (hereinafter, referred to as a rear-wheel drive system) that is provided separately from the front-wheel drive system 6 at a rear part of the vehicle is designed to be transmitted to rear wheels Wr (RWr, LWr). The motor 5 of the front-wheel drive system 6 and first and second motors 2A, 2B of the rear-wheel drive system 1 on a rear wheel Wr side are connected to a battery 9, so that both electric power supply from the battery 9 and energy regeneration to the battery 9 are enabled. Reference numeral 8 in FIG. 1 is a control unit for controlling the whole of the vehicle.

Firstly, a vehicle drive system of a first embodiment according to the invention will be described by reference to FIGS. 2 to 9.

Figure 2:
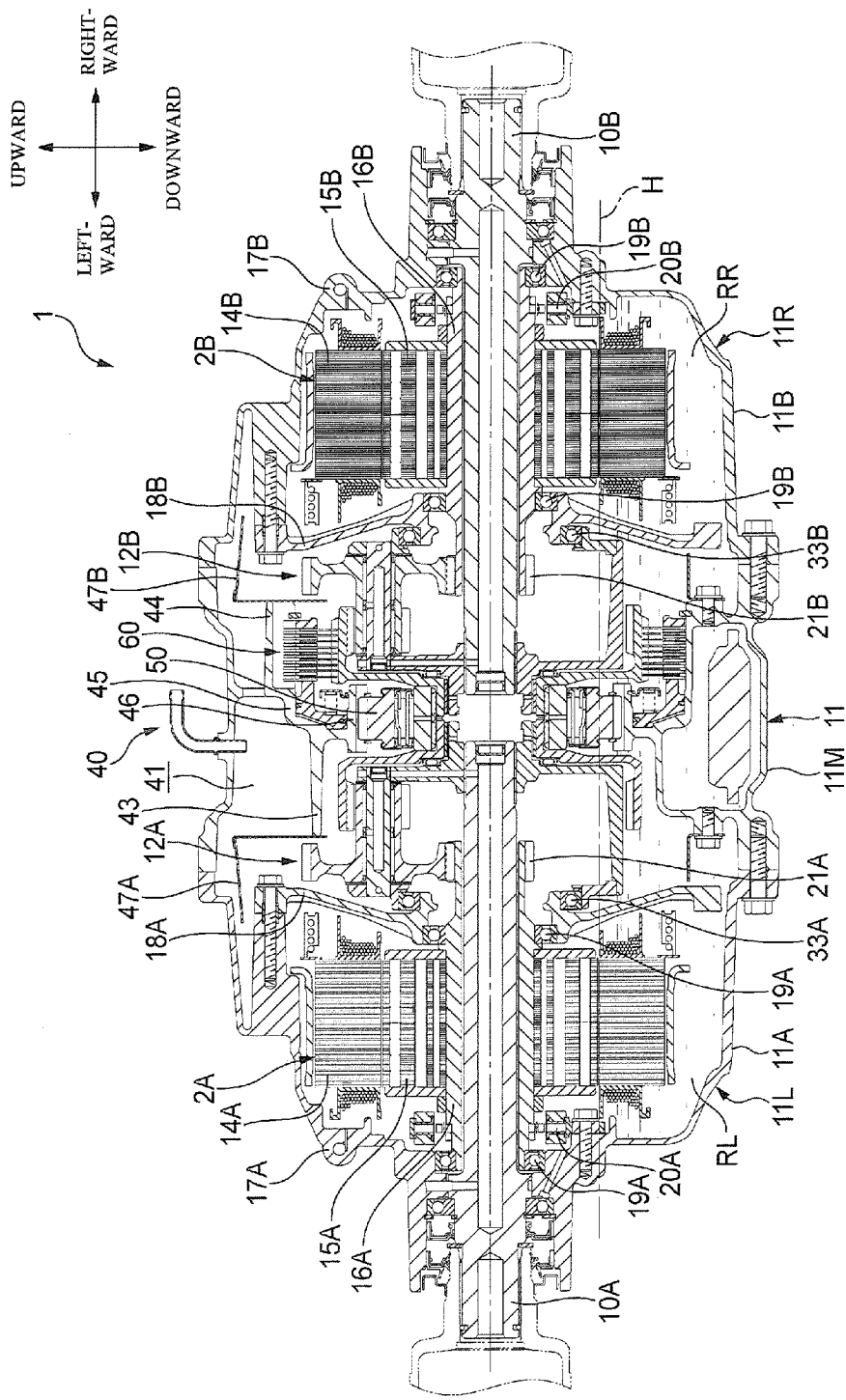
FIG. 2 is a vertical sectional view of a rear-wheel drive system of the first embodiment, taken along the line II-II shown in FIG. 7(b).
Figure 3:
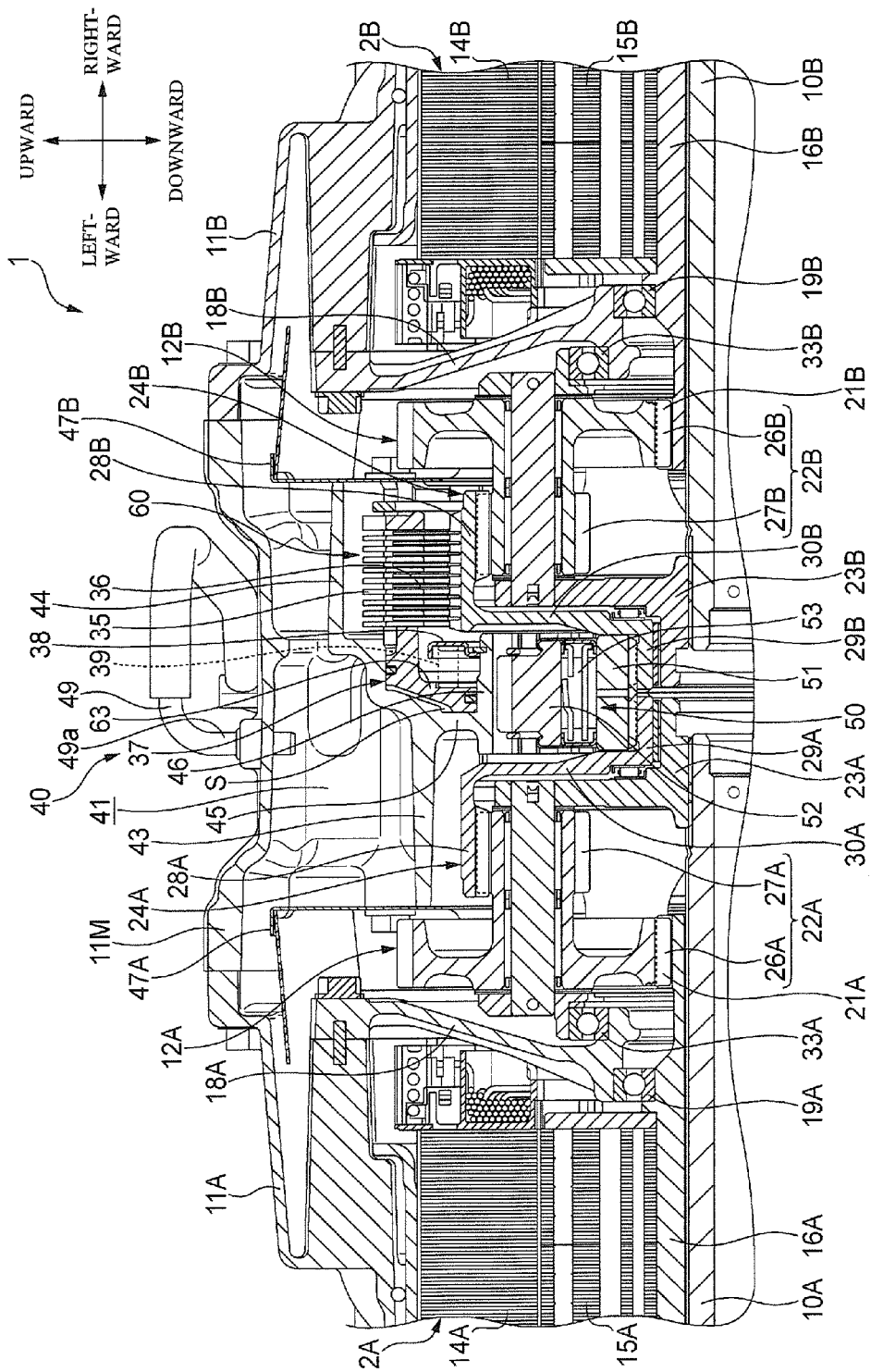
FIG. 3 is a partially enlarged sectional view of an upper portion of the rear-wheel drive system shown in FIG. 2.

FIG. 2 is an overall vertical sectional view of the rear-wheel drive system 1. FIG. 3 is a partially enlarged view of an upper portion of FIG. 2. In the same figure, reference numeral 11 denotes a case for the rear-wheel drive 1. The case 11 is made up of a middle case 11M that is disposed substantially in a central portion in a width direction of the vehicle and side cases 11A, 11B that are disposed to the left and right of the middle case 11M so as to hold the middle case 11M therebetween, the case 11 being formed substantially into a cylindrical shape. In an interior of the case 11, axles 10A, 10B for the rear wheels Wr, the first and second motors 2A, 2B for driving the axles and a first and second planetary gear type speed reducers 12A, 12B as a first and second speed changers that decrease the rotational drive of the motors 2A, 2B are disposed on the same axis. The axle 10A, the first motor 2A and the first planetary gear type speed reducer 12A control to drive a left rear wheel LWr, and the axle 10B, the second motor 2B and the second planetary gear type speed reducer 12B control to drive a right rear wheel RWr. The axle 10A, the first motor 2A and the first planetary gear type speed reducer 12A and the axle 10B, the second motor 2B and the second planetary gear type speed reducer 12B are disposed symmetric laterally in the width direction of the vehicle within the case 11.

Figure 4:
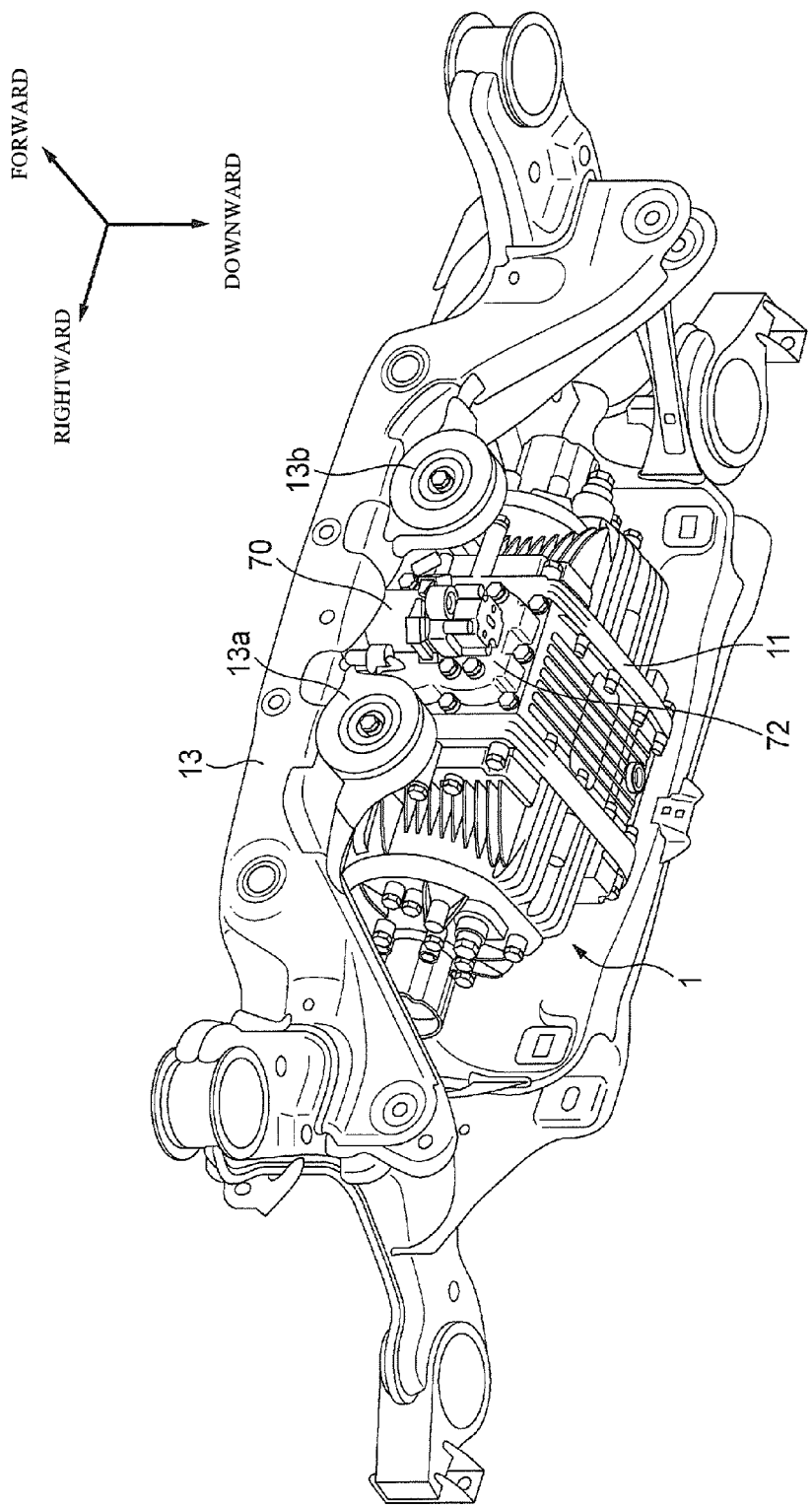
FIG. 4 is a perspective view showing a state in which the vehicle drive system shown in FIG. 1 is mounted in a frame.

Bulkheads 18A, 18B each extending radially inwards are provided at middle case 11M sides of the side cases 11A, 11B, respectively, and the first and second motors 2A, 2B are disposed between the side cases 11A, 11B and the bulkheads 18A, 18B, respectively. The first and second planetary gear type speed reducers 12A, 12B are disposed in spaces surrounded by the middle case 11M and the bulkheads 18A, 18B, respectively. Note that in this embodiment, as shown in FIG. 2, the left side case 11A and the middle case 11M make up a first case 11L that accommodates the first motor 2A and the first planetary gear type speed reducer 12A, and the right side case 11B and the middle case 11M make up a second case 11R that accommodates the second motor 2B and the second planetary gear type speed reducer 12B. Then, the first case 11L has a left reservoir portion RL that reserves oil as a liquid fluid that is used to lubricate and/or cool at least one of the first motor 2A and a power transmission line. The second case 11R has a right reservoir portion RR that reserves oil used to lubricate and/or cool at least one of the second motor 2B and a power transmission line. As shown in FIG. 4, the case 11 is supported by supporting portions 13*a*, 13*b* of a frame member 13 which makes up part of a frame which makes up, in turn, a framework of the vehicle 3 and a frame, not shown, of the rear-wheel drive system 1. The supporting portions 13*a*, 13*b* are provided left and right with respect to the center of the frame member 13 in the width direction of the vehicle. Note that in FIGS. 2 to 12, arrows denote a positional relationship when the rear-wheel drive system 1 is installed in the vehicle.

A breather unit 40 that establishes a communication between the interior and an exterior of the case 11 is provided in the rear-wheel system 1, so that air in the interior of the case 11 is released to the exterior by way of a breather chamber 41 to thereby prevent the temperature and pressure of air in the interior of the case 11 from being increased. The breather chamber 41 is disposed in a vertical upper portion of the case 11 and is made up of a space defined by an external wall of the middle case 11M, a first cylindrical wall 43 that is provided within the middle case 11M so as to extend substantially horizontally towards the left side case 11A, a second cylindrical wall 44 that is provided so as to extend substantially horizontally towards the right side case 11B, a laterally dividing wall 45 that connects inner end portions of the first and second cylindrical walls 43, 44 to each other, a baffle plate 47A that is mounted so as to be brought into abutment with a left side case 11A side end portion of the first cylindrical wall 43 and a baffle plate 47B that is mounted so as to be brought into abutment with a right side case 11B side end portion of the second cylindrical wall 44.

In the first and second cylindrical walls 43, 44 and the laterally dividing wall 45 that form a lower surface of the breather chamber 41, the first cylindrical wall 43 is situated further radially inwards than the second cylindrical wall 44, and the laterally dividing wall 45 extends to an inner end portion of the first cylindrical wall 43 while being bent in such a manner as to be contracted diametrically from an inner end portion of the second cylindrical wall 44 and further extends radially inwards to reach a third cylindrical wall 46 that extends substantially horizontally. The third cylindrical wall 46 is situated further inwards than both outer end portions of the first cylindrical wall 43 and the second cylindrical wall 44 and in a substantially central position therebetween.

Figure 5:
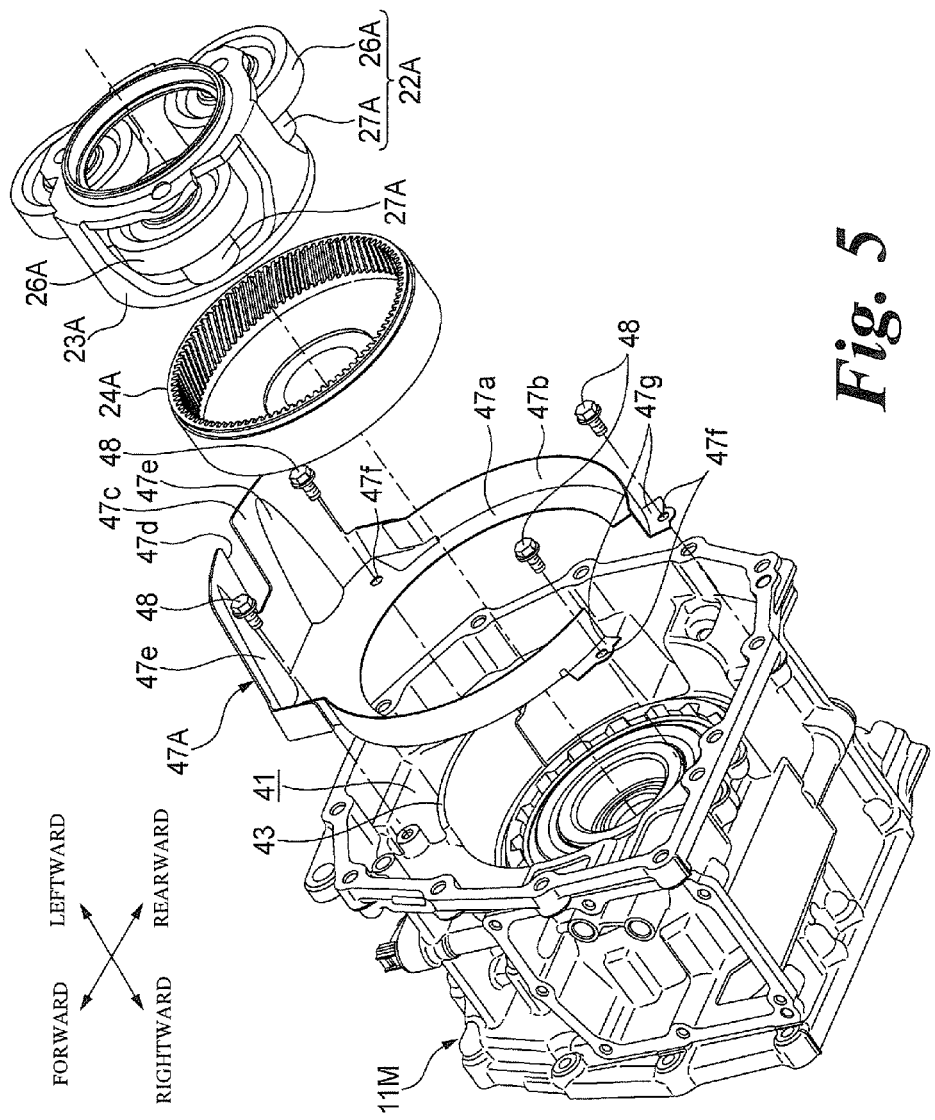
FIG. 5 is a partially exploded perspective view of the rear-wheel drive system shown in FIG. 2.

FIG. 5 is a partially exploded perspective view of the rear-wheel drive system shown in FIG. 2. Although FIG. 5 shows only the left baffle plate 47A and the left planetary gear type speed reducer 12A, the right baffle plate 47B and the right planetary gear type speed reducer 12B have a similar configuration.

The baffle plates 47A, 47B each have a substantially annular shape in which a thin plate-like side wall portion 47a is opened at a lower end thereof, and a rib 47b is provided so as to surround an outer edge of the side wall portion 47a. The side wall portion 47a is provided so as to extend radially outwards at an upper portion thereof so as to separate a space defined between the first cylindrical wall 43 and an external wall of the middle case 11M or a space defined between the second cylindrical wall 44 and the external wall of the middle case 11M from the planetary gear type speed reducer 12A or the planetary gear type speed reducer 12B. A ceiling plate 47c is provided so as to extend from an outer edge of the upper portion of the side wall portion 47a in such a manner as to be inclined slightly downwards from a direction that is at right angles thereto. A cutout 47d is provided in the center of the ceiling plate 47c so as to make the length of the ceiling plate 47c in the center shorter than those at both circumferential sides thereof. Then, air within the case 11 is introduced into the breather chamber 41 by way of the cutout 47d and a distal end portion of the ceiling plate 47c. In the ceiling plate 47c, a concavely depressed groove portion 47e is provided on each side of the cutout 47d. The baffle plates 47A, 47B are each fixed to the middle case 11M with bolts 48 that are passed through two bolt holes 47f provided at the upper portion of the side wall portion 47a and bolt holes 47f in two attachment pieces 47g provided at a lower portion of the rib 47b.

Returning to FIGS. 2 and 3, an external communication path 49 that establishes a communication between the breather chamber 41 and the exterior of the case 11 is provided on the middle case 11M so as to connect to a vertical upper surface of the breather chamber 41. A breather chamer side end portion 49a of the external communication path 49 is disposed so as to be directed vertically downwards. Consequently, oil is restrained from being discharged to the exterior of the case 11 by way of the external communication path 49.

In the first and second motors 2A, 2B, stators 14A, 14B are fixed to the side cases 11A, 11B, respectively, and annular rotors 15A, 15B are disposed rotatably on inner circumferential sides of the stators 14A, 14B. Cylindrical shafts 16A, 16B that surround outer circumferences of the axles 10A, 10B are connected to inner circumferential portions of the rotors 15A, 15B. These cylindrical shafts 16A, 16B are supported via end walls 17A, 17B of the side cases 11A, 11B and the bulkheads 18A, 18B of the reduction gear case 11 via bearings 19A, 19B so as to rotate relative to and concentric with the axles 10A, 10B. Resolvers 20A, 20B that feed information on rotational positions of the rotors 15A, 15B back to a controller (not shown) for controlling the motors 2A, 2B are provided on outer circumferences of one end portions of the cylindrical shafts 16A, 16B and on the end walls 17A, 17B.

The first and second planetary gear type speed reducers 12A, 12B include sun gears 21A, 21B, pluralities of planetary gears 22A, 22B that are caused to mesh with the sun gears 21, planetary carriers 23A, 23B that support these planetary gears 22A, 22B and ring gears 24A, 24B that are caused to mesh with outer circumferential sides of the planetary gears 22A, 22B. Driving forces of the motors 2A, 2B are inputted into the planetary gear type speed reducers 12A, 12B from the sun gears 21A, 21B and the decelerated driving forces are outputted therefrom to the axles 10A, 10B through the planetary carriers 23A, 23B.

The sun gears 21A, 21B are formed integrally with the cylindrical shafts 16A, 16B. The planetary gears 22A, 22B are double pinions that have first pinions 26A, 26B that are larger in diameter and which are caused to mesh directly with the sun gears 21A, 21B and second pinions 27A, 27B that are smaller in diameter than the first pinions 26A, 26B, and the first pinions 26A, 26B and the second pinions 27A, 27B are formed integrally in such a manner that the first and second pinions are concentric and are offset in an axial direction. The planetary gears 22A, 22B are supported by the planetary carriers 23A, 23B. Axially inner end portions of the planetary carriers 23A, 23B extend radially inwards and spline fit on the axles 10A, 10B, whereby the planetary carriers 23A, 23B are supported on the axles 10A, 10B so as to rotate together therewith. The planetary carriers 23A, 23B are also supported on the bulkheads 18A, 18B via bearings 33A, 33B.

Figure 6:
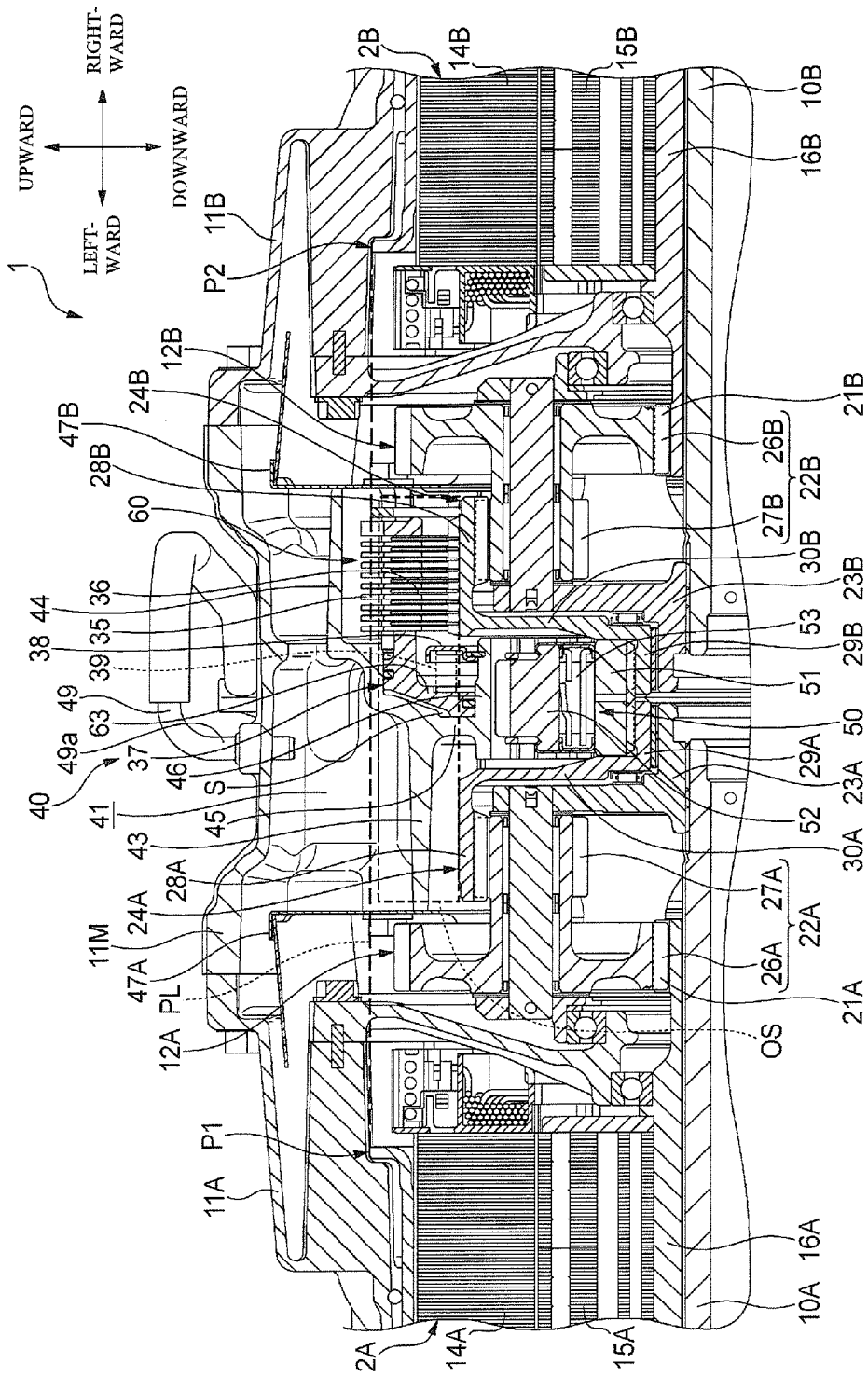
FIG. 6 is a partially enlarged sectional view of the upper portion of the rear-wheel drive system shown in FIG. 2.

The ring gears 24A, 24B include gear portions 28A, 28B that mesh with the second pinions 27A, 27B which are smaller in diameter on inner circumferential surfaces, small-diameter portions 29A, 29B that are smaller in diameter than the gear portions 28A, 28B and which are disposed so as to face oppositely each other in a middle position of the case 11 and connecting portions 30A, 30B that connect axially inner end portions of the gear portions 28A, 28B with axially outer end portions of the small-diameter portions 29A, 29B in a radial direction. In the case of this embodiment, radially outer edges of the ring gears 24A, 24B are set so as to be smaller than maximum distances of the first pinions 26A, 26B from centers of the axles 10A, 10B. As shown in FIG. 6, the radially outer edges of the ring gears 24A, 24B are formed smaller than radially outermost edge portions P1, P2 of the motors 2A, 2B, whereby an offset space OS that is recessed further radially than an imaginary line PL that connects the radially outermost edge portion of the motor 2A with the radially outermost edge portion of the motor 2B is provided radially outwards of the ring gear 24A of the planetary gear type speed reducer 12A and the ring gear 24B of the planetary gear type speed reducer 12B.

The gear portions 28A, 28B face oppositely each other with the third cylindrical wall 46 that is formed at a radially inner end portion of the laterally dividing wall 45 of the middle case 11M. The small-diameter portions 29A, 29B spline fit on an inner race 51 of a one-way clutch 50, which will be described later, on outer circumferential surfaces thereof, and the ring gears 24A, 24B are coupled to each other so as to rotate together with the inner race 51 of the one-way clutch 50.

A space portion is secured on a planetary gear type speed reducer 12B side of the offset space OS and between the second cylindrical wall 44 of the middle case 11M that makes up the case 11 and the gear portion 28B of the ring gear 24B, and a hydraulic brake 60, which is configured as a brake unit for the ring gear 24B, is disposed in the space portion so as to overlap the first pinion 26B in the radial direction and overlap the second pinion 27B in the axial direction. In the hydraulic brake 60, a plurality of fixed plates 35 that spline fit on an inner circumferential surface of the second cylindrical wall 44 and a plurality of rotational plates 36 that spline fit on an outer circumferential surface of the gear portion 28B of the ring gear 24B are disposed alternately in the axial direction, and these plates 35, 36 are operated to be engaged with and disengaged from each other by an annular piston 37. The piston 37 is accommodated in a reciprocating fashion in an annular cylinder compartment that is defined by the laterally dividing wall 45 of the middle case 11M and the third cylindrical wall 46. The piston 37 is biased normally in a direction in which the fixed plates 35 and the rotational plates 36 are disengaged from each other by an elastic member 39 that is supported on a bearing seat 38 provided on an outer circumferential surface of the third cylindrical wall 46.

More specifically, a space defined between the laterally dividing wall 45 and the piston 37 is configured as a hydraulic chamber S into which oil is introduced directly. When the pressure of oil that is introduced into the hydraulic chamber S is superior in magnitude to the biasing force of the elastic member 39, the piston 37 advances (moves rightwards), whereby the fixed plates 35 and the rotational plates 36 are pressed against each other and are then brought into engagement with each other. When the biasing force of the elastic member 39 is superior in magnitude to the pressure of oil that is introduced into the hydraulic chamber S, the piston 37 is withdrawn (moves leftwards), whereby the fixed plates 35 and the rotational plates 36 are caused to move away from each other and the engagement therebetween is released. Note that the hydraulic brake 60 is connected to an electric oil pump 70 (refer to FIG. 4) functioning as a liquid fluid supply unit.

In the case of the hydraulic brake 60, the fixed plates 35 are supported on the second cylindrical wall 44 that extends from the laterally dividing wall 45 of the middle case 11M that makes up the case 11, while the rotational plates 36 are supported on the gear portion 28B of the ring gear 24B. Therefore, when both the plates 35, 36 are pressed against each other by the piston 37, a braking force is applied to the ring gear 24B to fix it in place by virtue of frictional engagement of both the plates 35, 36. Then, when the engagement of the plates implemented by the piston 37 is released from that state, the ring gear 24B is permitted to rotate freely. Since the ring gears 24A, 24B are coupled to each other as described above, when the hydraulic brake 60 is applied, the braking force is also applied to the ring gear 24A so as to fix it in place, while when the hydraulic brake 60 is released, the ring gear 24A is also permitted to rotate freely.

A space portion is also secured between the connecting portions 30A, 30B of the ring gears 24A, 24B that face oppositely each other in the axial direction, and the one-way clutch 50 is disposed in the space portion, the one-way clutch 50 being adapted to transmit only power acting in one direction on the ring gears 24A, 24B and to cut off power acting in the other direction. The one-way clutch 50 is such that a number of sprags 53 are interposed between the inner race 51 and an outer race 52, and the inner race 51 spline fits on the small-diameter portions 29A, 29B of the ring gears 24A, 24B so as to rotate together therewith. The outer race 52 is positioned and is restricted from rotation by the third cylindrical wall 46.

The one-way clutch 50 is engaged when the vehicle 3 travels forwards based on the power of the motors 2A, 2B so as to lock the rotation of the ring gears 24A, 24B. More specifically, the one-way clutch 50 is put in an engaged state when rotational power in a forward direction (a rotational direction when the vehicle 3 travels forwards) at the motors 2A, 2B is inputted to the wheels Wr, while the one-way clutch 50 is put in a disengaged state when backward rotational power at the motors 2A, 2B is inputted into the wheels Wr. The one-way clutch 50 is put in the disengaged state when forward rotational power at the wheels Wr is inputted into the motors 2A, 2B, while the one-way clutch 50 is put in the engaged state when backward rotational force at the wheels Wr is inputted into the motors 2A, 2B.

In this way, in the rear-wheel drive system 1 of this embodiment, the one-way clutch 50 and the hydraulic brake 60 are provided in parallel on a power transmission line between the motors 2A, 2B and the wheels Wr. Additionally, the hydraulic brake 60 is controlled to be put in a released state, a weakly applied state and an applied state according to the states where the vehicle is driven or whether the one-way clutch 50 is in the engaged or disengaged state by the pressure of oil that is supplied from the oil pump 70. For example, when the vehicle 3 travels forwards based on the power driving of the motors 2A, 2B (when the vehicle travels forwards at low vehicle speeds or middle vehicle speeds), the one-way clutch 50 is engaged, and the power transmission is enabled. However, even in the event that due to the hydraulic brake 60 being controlled to be put in the weakly applied state, the input of forward rotational power from the motors 2A, 2B is temporarily decreased, putting the one-way clutch 50 in the disengaged state, the power transmission between the motors 2A, 2B and the wheels Wr is restrained from being interrupted. When the vehicle 3 travels forwards based on the power driving of the internal combustion engine 4 and/or the motor 5 (when the vehicle travels forwards at high vehicle speeds), the one-way clutch 50 is disengaged and the hydraulic brake is controlled to be put in the released state, whereby the overspeed of the motors 2A, 2B is prevented. On the other hand, when the vehicle 3 is reversed or is driven in a regenerative fashion, the one-way clutch 50 is disengaged, and therefore, the hydraulic motor 60 is controlled to be put in the applied state, whereby backward rotational power from the motors 2A, 2B is outputted to the wheels Wr or forward rotational power at the wheels Wr is inputted to the motors 2A, 2B.

Figure 7:
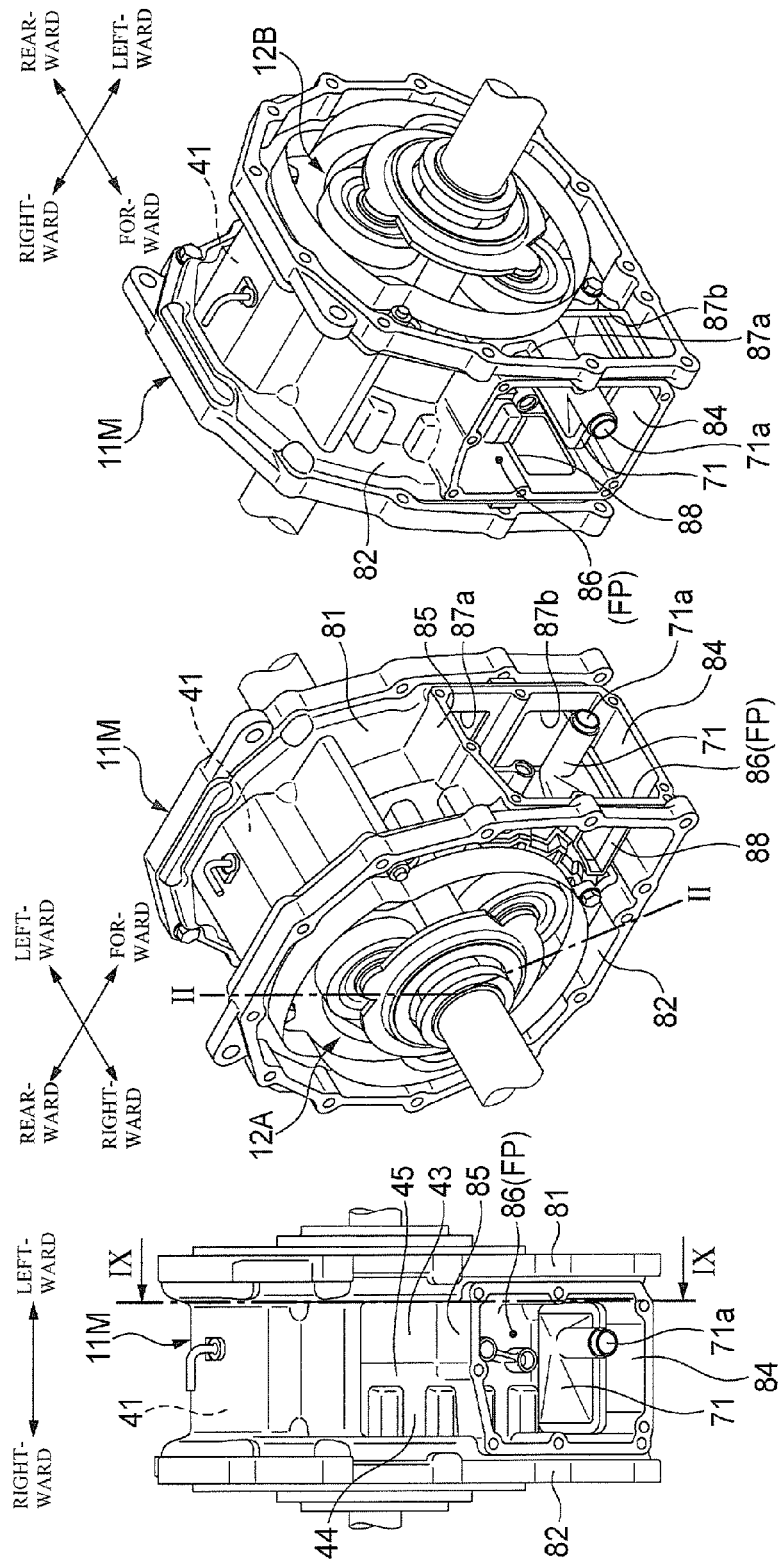
FIG. 7(*a*) is a front view showing the construction of the periphery of a central case, (b) is a perspective view of (a) as seen from the right and (c) is a perspective view of (a) as seen from the left.
Figure 8:
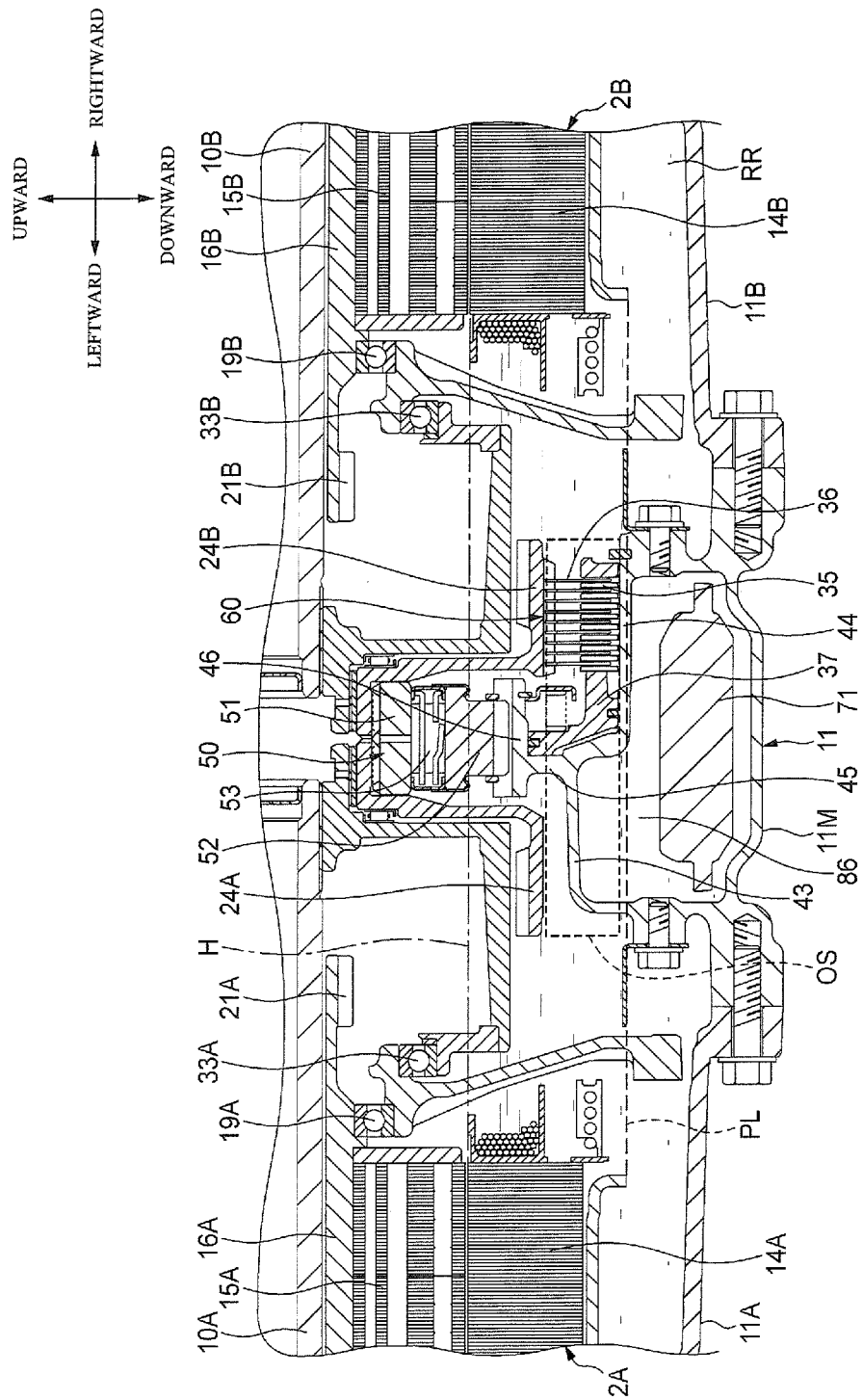
FIG. 8 is a partially enlarged view of a lower portion of the rear-wheel drive system shown in FIG. 2.
Figure 9:
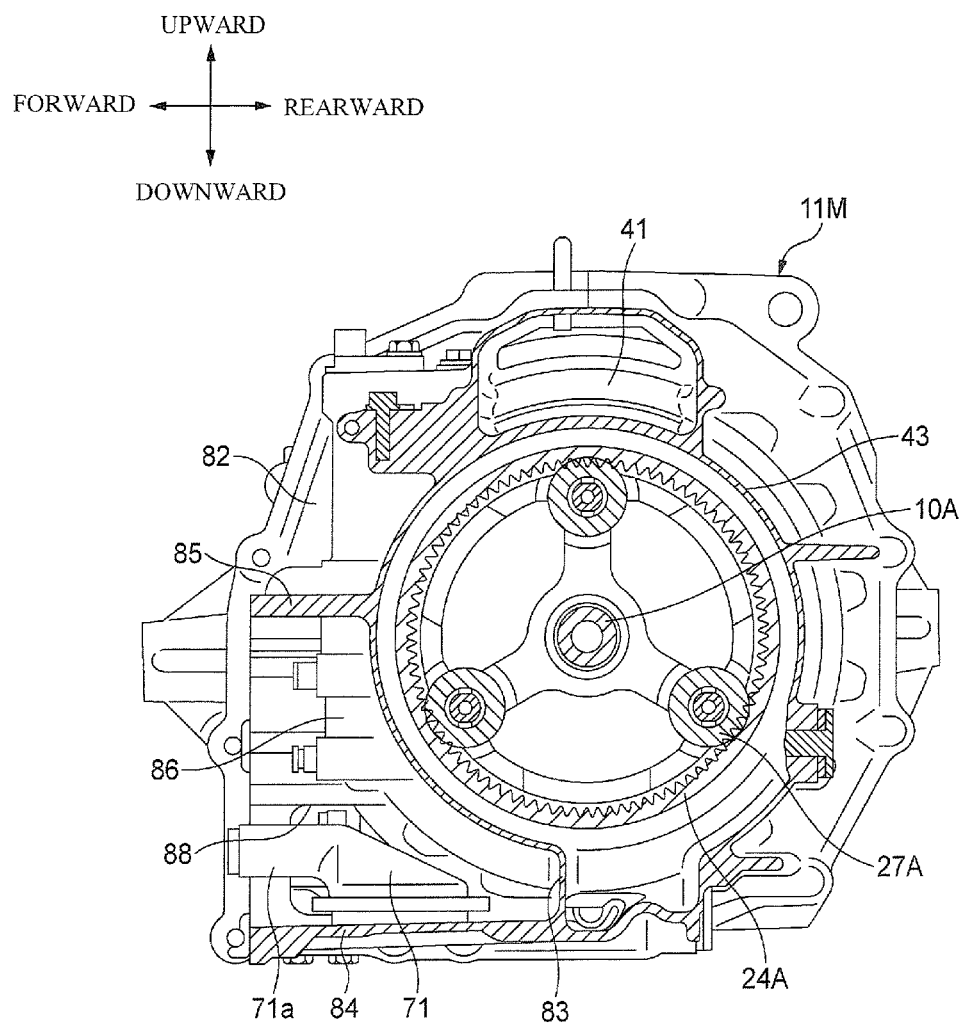
FIG. 9 is a sectional view taken along the line IX-IX shown in FIG. 7(*a*).

As shown in FIGS. 7 to 9, outer circumferential surfaces of the first and second cylindrical walls 43, 44 and the laterally dividing wall 45 of the middle case 11M are exposed to the outside at other portions than where the breather chamber 41 is formed, and a pair of protruding portions 81, 82 are formed on the outer circumferential surface of the first and second cylindrical walls 43, 44 and the laterally dividing wall 45 so as to protrude in the radial direction from both axial end portions thereof.

A strainer accommodation compartment (a central volumetric capacity room) 86 where a strainer 71 is accommodated is defined obliquely below the first and second cylindrical walls 43, 44 and the laterally dividing wall 45 by the outer circumferential surfaces of the first and second cylindrical walls 43, 44 and the laterally dividing wall 45, a wall portion 83 that is formed below these outer circumferential surfaces, a bottom portion 84 that extends forwards from below the wall portion 83, an upper wall 85 that extends forwards from a middle portion of the outer circumferential surfaces and the pair of protruding portions 81, 82. Consequently, the strainer accommodation compartment 86 is formed so as to include a space below a vertical lowermost portion of the ring gear 24A of the first planetary gear type speed reducer 12A (refer to FIG. 9). A front opening in this strainer accommodation compartment 86 is closed by a lid member 72 (refer to FIG. 4) on which the electric oil pump 70 is mounted, and a discharge port 71a of the strainer 71 is connected to the electric oil pump 70. Because of this, foreign matters in oil that is taken in from an inlet port (not shown) provided in a lower surface of the strainer 71 are removed by the strainer 71 and the oil free from foreign matters is then sent to the electric oil pump 70.

Through holes 87a, 87b functioning as left-middle communication paths that establish a communication between the left reservoir portion RL and the strainer accommodation compartment 86 and a through hole 88 functioning as a right-middle communication path that establishes a communication between the right reservoir portion RR and the strainer compartment accommodation compartment 86 are formed, respectively, in the pair of protruding portions 81, 81 that make up the strainer accommodation compartment 86. By adopting this configuration, the left reservoir portion RL and the right reservoir portion RR are allowed to communicate with each other by way of a lateral communication path FP that is made up of the strainer accommodation compartment 86.

In the rear-wheel drive system 1 of this embodiment, at a vertical upper portion of the middle case 11M, at least part of the breather chamber 41 is disposed within the offset space OS that is formed radially outwards of the ring gear 24A of the planetary gear type speed reducer 12A and the ring gear 24B of the planetary gear type speed reducer 12B, more specifically, on a planetary gear type speed reducer 12A side of the offset space OS. In this configuration, by disposing the breather chamber 41 of the breather unit 40 by making use of the offset space OS that is obtained by forming radially outer edges of the ring gears 24A, 24B of the planetary gear type speed reducers 12A, 12B smaller than radially outermost edge portions of the motors 2A, 2B, it is possible to expand the breather chamber 41. When the volumetric capacity of the breather chamber 41 is not changed, it is possible to make the drive system 1 smaller in size by suppressing a radial expansion of the case 11 itself.

In this embodiment, the offset space OS is formed by forming the radially outer edges of the ring gears 24A, 24B of the planetary gear type speed reducers 12A, 12B smaller than the radially outermost edge portions of the motors 2A, 2B. However, the offset space OS may be formed by forming at least part of the radially outer edge of the rotational element of the planetary gear type speed reducer 12A or the radially outer edge of the rotational element of the planetary gear type speed reducer 12B smaller than a smaller one of the radially outermost edge portion of the motor 2A and the radially outermost edge portion of the motor 2B. Note that the rotational elements are not limited to the ring gears 24A, 24B. The speed changers are not limited to the planetary gear type speed reducers 12A, 12B, and hence, known speed changers may be used. In the case of a rotational element that walks around a central gear, the radially outer edge of the rotational element means an outer edge of a locus formed by the rotational element that so walks around.

According to the embodiment, the ring gears 24A, 24B of the planetary gear type speed reducers 12A, 12B are coupled to each other, and the hydraulic brake 60 is provided at the joint portion therebetween, whereby it is possible to reduce the number of components involved. Since at least part of the hydraulic brake 60 is disposed within the offset space, it is possible to reduce the size of the drive system 1 (the case) in the radial direction.

According to the embodiment, at least part of the hydraulic brake 60 is disposed on the planetary gear type speed reducer 12B side and at least part of the breather chamber 41 is disposed on a planetary gear type speed reducer 12A side in the offset space OS, whereby it is possible to make the disposition of the hydraulic brake 60 compatible with the expansion of the breather chamber 41. On the contrary, a configuration may be adopted in which at least part of the hydraulic brake 60 is disposed on the planetary gear type speed reducer 12A side and at least part of the breather chamber 41 is disposed on the planetary gear type speed reducer 12B side in the offset space OS.

According to the embodiment, the breather chamber 41 is formed so as to include at least a space above a vertically uppermost portion of the ring gear 24A of the planetary gear type speed reducer 12A. Since the radially outer edge of the ring gear 24A of the planetary gear type speed reducer 12A has the circular shape, the offset space OS is formed into the cylindrical shape. However, by forming part of the offset space OS so as to include a space above a vertically uppermost portion of the ring gear 24A, it is possible to restrain the intrusion of oil into the breather chamber 41.

According to the embodiment, the breather unit 40 has further the external communication path 49 that establishes the communication between the breather chamber 41 and the exterior of the case 11, and the external communication path 49 is connected to the vertical upper surface of the breather chamber 41. Therefore, it is possible to restrain the discharge of oil to the exterior by way of the external communication path 49.

According to the embodiment, the breather chamber side end portion 49a of the external communication path 49 is disposed so as to be directed vertically downwards, and therefore, it is possible to restrain the discharge of oil to the exterior more effectively.

According to the embodiment, by configuring the planetary gears 22A, 22B that are supported by the planetary carriers 23A, 23B as the double pinions that are made up of the first pinions 26A, 26B having the large diameter that mesh with the sun gears 21A, 21B and the second pinions 27A, 27B that are smaller in diameter than the first pinions 26A, 26B and which mesh with the ring gears 24A, 24B, it is possible to expand the offset space OS lying radially outwards of the ring gears 24A, 24B accordingly. Additionally, by disposing the hydraulic brake 60 in the offset space OS so expanded, it is possible to reduce the size of the drive system 1 (the case) in the radial direction.

According to the embodiment, the hydraulic brake 60 has the fixed plates 35 that are fixed to the case 11 and the rotational plates 36 that are fixed to the ring gears 24A, 24B so as to rotate together therewith. Then, by frictionally engaging or releasing both the plates 35, 36 with or from each other, the ring gears 24A, 24B are fixed to the case 11 or the ring gears 24A, 24B are released from the case 11. Thus, it is possible to simplify the configuration of the hydraulic brake 60, and it is further possible to adjust easily the application force of the hydraulic brake 60 by adjusting the number of plates or the contact surface areas of the plates.

According to the embodiment, by disposing the motors 2A, 2B and the planetary gear type speed reducers 12A, 12B coaxially, it is possible to form the drive system into the cylindrical shape, thereby making it possible to increase the installation properties of the drive system.

According to the embodiment, in the rear-wheel drive system 1, as shown in FIG. 8, at the vertical upper portion of the middle case 11M, at least part of the strainer accommodation compartment 86 is disposed within the offset space OS that is formed radially outwards of the ring gear 24A of the planetary gear type speed reducer 12A and the ring gear 24B of the planetary gear type speed reducer 12B, more specifically, on the planetary gear type speed reducer 12A side in the offset space OS. In this configuration, by disposing the strainer accommodation compartment 86 of the lateral communication path FP by making use of the offset space OS that is obtained by forming the radially outer edges of the ring gears 24A, 24B of the planetary gear type speed reducers 12A, 12B smaller than the radially outermost edge portions of the motors 2A, 2B, it is possible to expand the strainer accommodation compartment 86. Additionally, when the volumetric capacity of the strainer accommodation compartment 86 is not changed, it is possible to make the drive system 1 smaller in size by suppressing the radial expansion of the case 11 itself.

According to the embodiment, the strainer accommodation compartment 86 is formed so as to include the space below the vertically lowermost portion of the ring gear 24A of the first planetary gear type speed reducer 12A. An fluid level height H of the liquid fluid that is reserved in the case 11 and which is used to lubricate and/or cool the first and second motors 2A, 2B is set to a position that is lower than lowermost portions of the rotors 15A, 15B of the first and second motors 2A, 2B in consideration of stirring resistance. Additionally, the vertically lowermost portion of the ring gear 24 is situated in a position that is lower than the rotors 15A, 15B of the first and second motors 2A, 2B. Consequently, it is possible to ensure the flow rate of the lateral communication path FP that communicates with the left reservoir portion RL and the right reservoir portion RR.

According to the embodiment, since the inlet port of the strainer 71 is disposed in the strainer accommodation compartment 86 of the lateral communication path FP whose volumetric capacity is ensured, it is possible to increase the degree of freedom in disposing the inlet port. Additionally, the fluid level in the strainer accommodation compartment 86 of the lateral communication path FP is stabler than those of the left reservoir portion RL and the right reservoir portion RR, and therefore, it is possible to restrain air from being taken into the strainer 71 and the electric oil pump 70.

According to the embodiment, by disposing at least part of the hydraulic brake 60 on the planetary gear type speed reducer 12B side and disposing at least part of the strainer accommodation compartment 86 on the planetary gear type speed reducer 12A side in the offset space OS, it is possible to make the disposition of the hydraulic brake 60 compatible with the expansion of the strainer accommodation compartment 86. The configuration may be adopted in which at least part of the hydraulic brake 60 is disposed on the planetary gear type speed reducer 12A side and at least part of the strainer accommodation compartment 86 is disposed on the planetary gear type speed reducer 12B side in the offset space OS.

According to the embodiment, the breather chamber 41 that is disposed within the offset space OS and the strainer accommodation compartment 86 are situated on the same circumference, it is possible to expand the volumetric capacities of the breather chamber 41 and the strainer accommodation compartment 86 individually by making effective use of the offset space OS. In addition, when the volumetric capacities of the breather chamber 41 and the strainer accommodation compartment 86 are not changed, it is possible to make the drive system 1 smaller in size by restraining the radial expansion of the case 11 itself.

In particular, at least part of the breather chamber 41 that is formed so as to include the space above the vertically uppermost portion of the ring gear 24A and at least part of the strainer accommodation compartment 86 that is formed so as to include the space below the vertically lowermost portion of the ring gear 24A are disposed within the offset space OS. Therefore, it is possible to make the drive system 1 smaller in size in the vertical direction.

Second Embodiment

Figure 10:
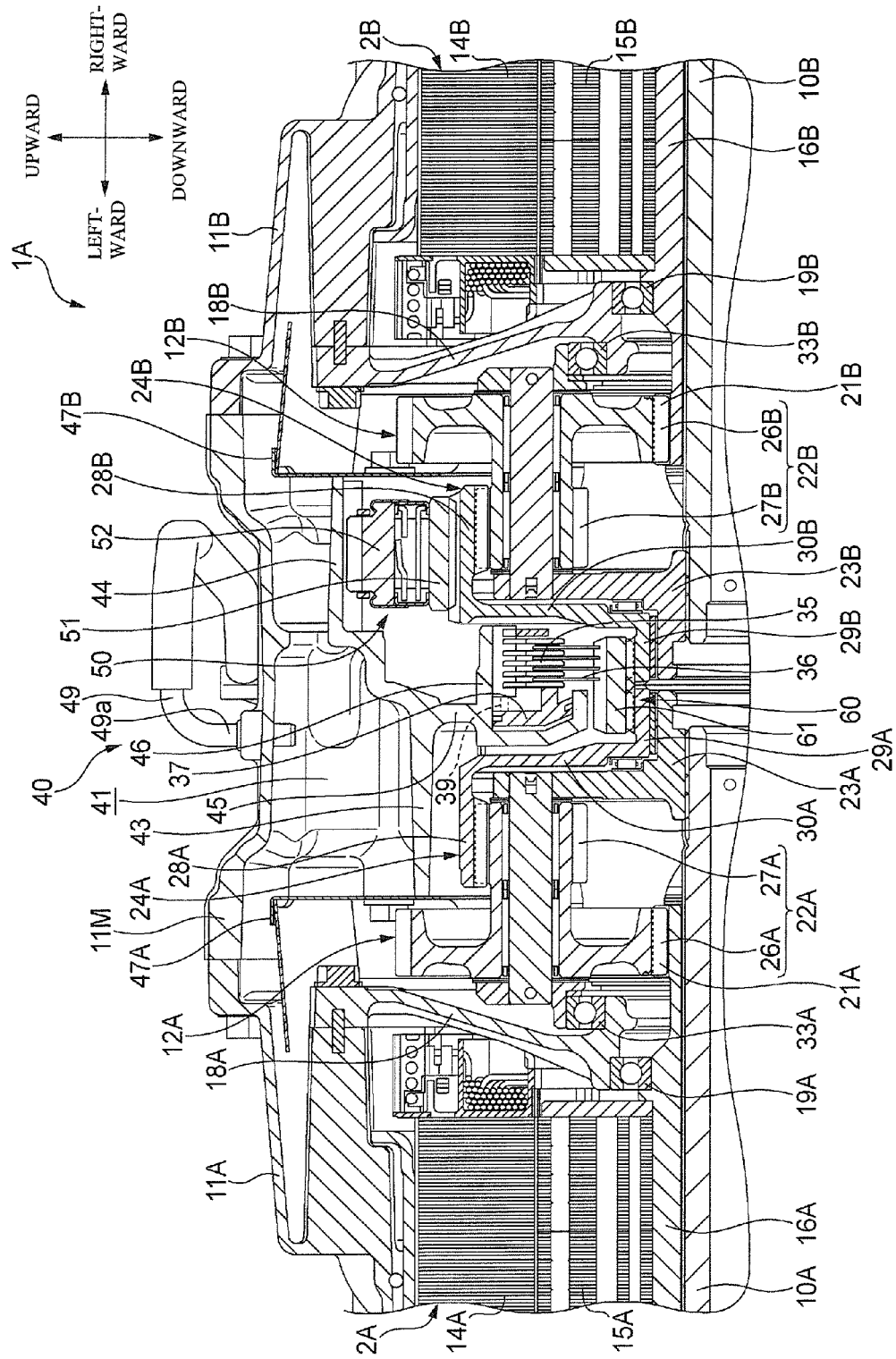
FIG. 10 is a partially enlarged view of an upper portion of a rear-wheel drive system of a second embodiment.
Figure 11:
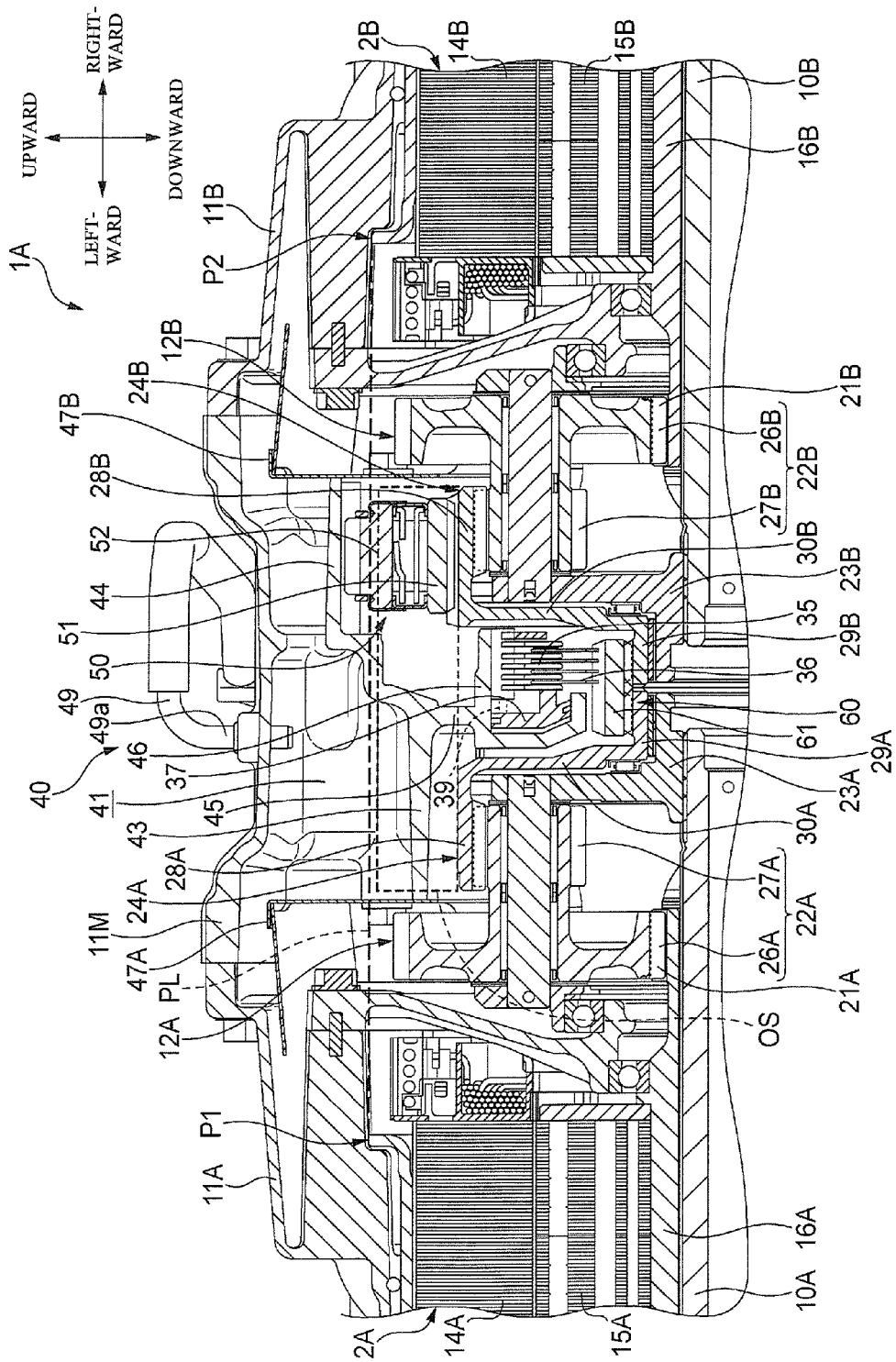
FIG. 11 is a partially enlarged view of the upper portion of the rear-wheel drive system of the second embodiment.

Next, a vehicle drive system of a second embodiment will be described by reference to FIGS. 10 to 12. Note that the vehicle drive system of the second embodiment has the same basic configuration as that of the vehicle drive system 1 of the first embodiment and differs therefrom in that a one-way clutch 50 and a hydraulic brake 60 are situated in different positions. Thus, only different features will be described in detail, and the description of like portions will be omitted here.

In a vehicle drive system 1A of this embodiment, a one-way clutch 50 is disposed within a space portion defined between a second cylindrical wall 44 of a middle case 11M that makes up a case 11 and a gear portion 28B of a ring gear 24B, and a hydraulic brake 60 that makes up a brake for ring gears 24A, 24B is disposed within a space portion defined between connecting portions 30A, 30B of the ring gears 24A, 24B that face oppositely each other in an axial direction.

The one-way clutch 50 is configured so that an inner race 51 spline fits on the gear portion 28B of the ring gear 24B so as to rotate together therewith and an outer race 52 is positioned and is restricted from rotation by the second cylindrical wall 44. In addition, in the hydraulic brake 60, a plurality of fixed plates 35 that spline fit in an inner circumferential surface of a third cylindrical wall 46 and a plurality of rotational plates 36 that spline fit on an outer circumferential surface of a holding member 61 that is attached to small-diameter portions 29A, 29B of the ring gears 24A, 24B are disposed alternately in the axial direction. Then, these plates 35, 36 are operated to be engaged with and released from each other by an annular piston 37.

In this way, in the vehicle drive system 1A, too, as with the vehicle drive system 1 of the first embodiment, since the one-way clutch 50 and the hydraulic brake 60 are provided in parallel on a power transmission line between motors 2A, 2B and wheels Wr, the same function as that of the first embodiment can be attained.

According to this embodiment, in a vertical upper portion of the middle case 11M, at least part of a breather chamber 41 is disposed on a planetary gear type speed reducer 12A side in an offset space OS. Consequently, it is possible to expand the breather chamber 41 by disposing the breather chamber 41 of a breather unit 40 by making use of the offset space OS that is obtained by forming radially outer edges of the ring gears 24A, 24B of planetary gear type speed reducers 12A, 12B smaller than radially outermost edge portions of the motors 2A, 2B. Additionally, when the volumetric capacity of the breather chamber 41 is not changed, it is possible to make the drive system 1A smaller in size by restraining the radial expansion of the case 11 itself.

According to the embodiment, the ring gears 24A, 24B of the planetary gear type speed reducers 12A, 12B are coupled to each other and the one-way clutch 50 is provided at the joint portion therebetween, whereby it is possible to reduce the number of components involved. At least part of the one-way clutch 50 is disposed within the offset space OS, and therefore, it is possible to reduce the size of the drive system 1A (the case) in the radial direction.

According to the embodiment, it is possible to make the disposition of the one-way clutch 50 compatible with the expansion of the breather chamber 41 by disposing at least part of the one-way clutch 50 on a planetary gear type speed reducer 12B side and disposing at least part of the breather chamber 41 on the planetary gear type speed reducer 12A side in the offset space OS. On the contrary, at least part of the one-way clutch 50 may be disposed on the planetary gear type speed reducer 12A side and at least part of the breather chamber 41 may be disposed on the planetary gear type speed reducer 12B side in the offset space OS.

Figure 12:
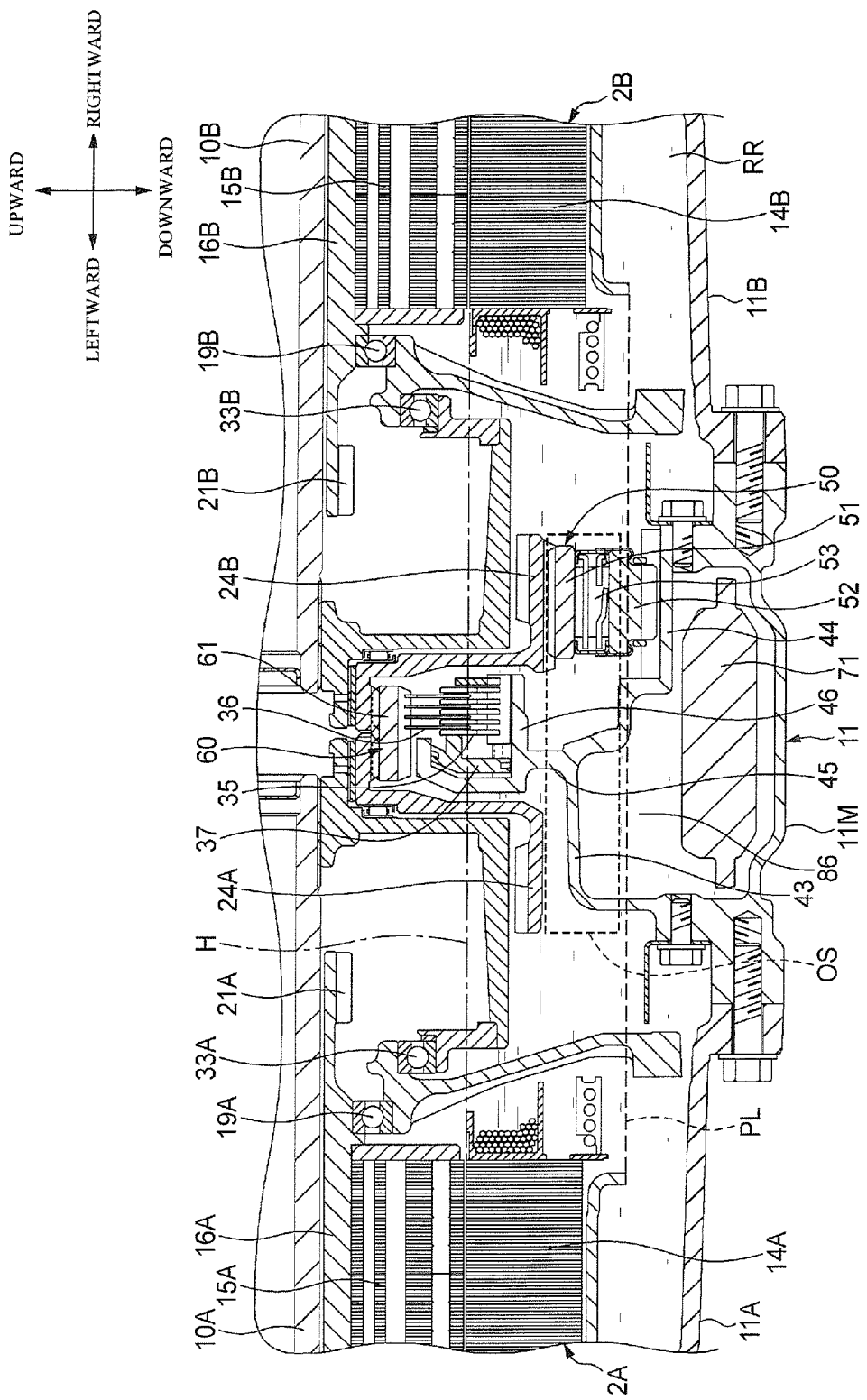
FIG. 12 a partially enlarged view of a lower portion of the rear-wheel drive system of the second embodiment.

According to the embodiment, as shown in FIG. 12, in a vertical lower portion of the middle case 11M, at least part of a strainer accommodation compartment 86 is disposed on the planetary gear type speed reducer 12A side in the offset space OS. Consequently, it is possible to expand the strainer accommodation compartment 86 by disposing the strainer accommodation compartment 86 of a lateral communication path FP by making use of the offset space OS that is obtained by forming the radially outer edges of the ring gears 24A, 24B of the planetary gear type speed reducers 12A, 12B smaller than the radially outermost edge portions of the motors 2A, 2B. Additionally, when the volumetric capacity of the strainer accommodation compartment 86 is not changed, it is possible to make the drive system 1A smaller in size by restraining the radial expansion of the case 11 itself.

According to the embodiment, it is possible to make the disposition of the one-way clutch 50 compatible with the expansion of the strainer accommodation compartment 86 by disposing at least part of the one-way clutch 50 on the planetary gear type speed reducer 12B side and disposing at least part of the strainer accommodation compartment 86 on the planetary gear type speed reducer 12A side in the offset space OS. On the contrary, at least part of the one-way clutch 50 may be disposed on the planetary gear type speed reducer 12A side and at least part of the strainer accommodation compartment 86 may be disposed on the planetary gear type speed reducer 12B side in the offset space OS.

However, in this embodiment, too, at least part of the breather chamber 41 and at least part of the strainer accommodation compartment 86 are disposed closer to either of the planetary gear type speed reducer 12A side and the planetary gear type speed reducer 12B side in the offset space OS on the same circumference.

Note that the invention is not limited to the embodiments that have been described heretofore and can be modified or improved as required.

The output shafts of the motors 2A, 2B and the axles 10A, 10B do not have to be disposed coaxially.

The front-wheel drive system 6 may be configured as a drive system that uses only the motor 5 as a single drive source without using the internal combustion engine 4.

The volumetric capacity room that is disposed in the offset space OS may be other volumetric capacity rooms other than the breather chamber and the strainer accommodation compartment.

In this embodiment, the left side case 11A and the middle case 11M make up the first case 11L, and the right side case 11B and the middle case 11M make up the second case 11R. However, the invention is not limited to this configuration, provided that the first case 11L of the invention is such as not only to accommodate the first motor 2A and the first planetary gear type speed reducer 12A but also to have the left reservoir portion RL and the second case 11R thereof is such as not only to accommodate the second motor 2B and the second planetary gear type speed reducer 12B but also to have the right reservoir portion RR.

The invention is based on Japanese Patent Application (No. 2010-222850) filed on Sep. 30, 2010, the contents of which are incorporated herein by reference.

DESCRIPTION OF REFERENCE NUMERALS AND CHARACTERS

1 Rear-wheel drive system (Vehicle drive system); 2A, 2B Motor; 11 Case; 11L First case; 11R Second case; 12A, 12B Planetary gear type speed reducer (Speed changer); 21A, 21B Sun gear (Second rotational element); 22A, 22B Planetary gear (Double pinion); 23A, 23B Planetary carrier (Carrier, Third rotational element); 24A, 24B Ring gear (First rotational element); 26A, 26B First pinion (Large-diameter pinion); 27A, 27B Second pinion (Small-diameter pinion); 35 Fixed plate; 36 Rotational plate; 40 Breather unit; 41 Breather chamber (Volumetric capacity room); 49 External communication path; 49 External communication path; 49a Breather chamber side end portion (Volumetric capacity room side end portion); 50 One-way clutch (One-way power-transmitting unit); 60 Hydraulic brake (Connection/disconnection unit); 86 Strainer accommodation compartment (Central volumetric capacity room); FP Lateral communication path; LWr Left rear wheel (Wheel); RL Left reservoir portion; RR Right reservoir portion; RWr Right rear wheel; OS offset space; P1, P2 Radially outermost edge portion; PL Imaginary line.

The invention claimed is:

1. A vehicle drive system including:
a motor that drives a wheel;
a speed changer that is provided on a power transmission line between the motor and the wheel; and
a case that accommodates the motor and the speed changer,
wherein the motor includes a first and second motors that are disposed left and right respectively in a width direction of a vehicle,
wherein the speed changer includes a first and second speed changers that are disposed left and right respectively in the width direction of the vehicle, wherein the case is a common case commonly containing the first motor, the first speed changer, the second motor and the second speed changer, wherein the first and second motors and the first and second speed changers are disposed coaxially inside the common case so as to define a common axis,
wherein the first motor and the first speed changer are disposed sequentially in this order from an outer side in the width direction of the vehicle, and the second motor and the second speed changer are disposed sequentially in this order from an outer side in the width direction of the vehicle such that the first and second speed changers are disposed between the first and second motors in the width direction of the vehicle inside the common case,
wherein at least part of a radially outer edge of a rotational element of the first speed changer or a radially outer edge of a rotational element of the second speed changer is formed smaller in a radial distance from the common axis than each of a radially outermost edge portion of the first motor and a radially outermost edge portion of the second motor,
wherein an offset space that is recessed further radially toward the common axis than a reference line that is defined by connecting the radially outermost edge portion of the first motor with the radially outermost edge portion of the second motor as viewed in a direction perpendicular to the common axis is provided radially outwards of the rotational element of the first speed changer or the rotational element of the second speed changer, and
wherein at least part of a volumetric capacity chamber that is partitioned from an interior of the common case and that communicates with the interior of the common case is disposed within the offset space.

2. The system of claim 1, further including:
a breather unit that establishes a communication between the interior and an exterior of the common case,
wherein the volumetric capacity chamber includes a breather chamber that makes up the breather unit and which restrains a liquid fluid that is used to lubricate and/or cool at least one of the motor and the power transmission line by circulating within the common case from flowing out to the outside thereof.

3. The system of claim 2, wherein the breather chamber is formed so as to include at least a space above a vertically uppermost portion of the rotational element of the first speed changer or the rotational element of the second speed changer.

4. The system of claim 3, wherein the breather unit has further an external communication path that establishes a communication between the breather chamber and an exterior thereof, and
wherein the external communication path is connected to a vertical upper surface of the breather chamber.

5. The system of claim 4, wherein a breather chamber side end portion of the external communication path is disposed so as to be directed vertically downwards.

6. The system of claim 1, wherein the first motor drives a left wheel and the second motor drives a right wheel,
wherein the common case has a first case that accommodates the first motor and the first speed changer and which has a left reservoir portion that reserves a liquid fluid that is used to lubricate and/or cool at least one of the first motor and the power transmission line and a second case that accommodates the second motor and the second speed changer line and which has a right reservoir portion that reserves a liquid fluid that is used to lubricate and/or cool at least one of the second motor and the power transmission line, and
wherein the volumetric capacity chamber includes a central volumetric capacity room that makes up a lateral communication path that establishes a communication between the left reservoir portion and the right reservoir portion.

7. The system of claim 6, wherein the central volumetric capacity room is formed so as to include a space below a vertical lowermost portion of the rotational element of the first speed changer or the second speed changer.

8. The system of claim 6, wherein an inlet port of a liquid fluid supply unit that is used to supply the liquid fluid is disposed in the central volumetric capacity room.

9. The system of claim 1, further including:
a breather unit that establishes a communication between the interior and an exterior of the common case,
wherein the first motor drives a left wheel and the second motor drives a right wheel, wherein the common case has a first case that accommodates the first motor and the first speed changer and which has a left reservoir portion that reserves a liquid fluid that is used to lubricate and/or cool at least one of the first motor and the power transmission line and a second case that accommodates the second motor and the second speed changer and which has a right reservoir portion that reserves a liquid fluid that is used to lubricate and/or cool at least one of the second motor and the power transmission line,
wherein the volumetric capacity chamber includes a breather chamber that makes up the breather unit and which restrains a liquid fluid within the common case from flowing out to the outside thereof and a central volumetric capacity room that makes up a lateral communication path that establishes a communication between the left reservoir portion and the right reservoir portion, and
wherein the breather chamber and the central volumetric capacity room that are disposed within the offset space are situated on a circumference of the same circle.

10. The system of claim 1, further including:
a connection/disconnection unit that is provided on the power transmission line between the motors and the wheel and which puts a motor side and a wheel side in a connected state or a disconnected state by being applied or released,
wherein the first and second speed changers are each made up of three rotational elements,
wherein first rotational elements of the three rotational elements of the first and second speed changers are coupled to each other,
wherein the connection/disconnection unit is provided on the first rotational element that is coupled thereto, and
wherein at least part of the connection/disconnection unit is disposed within the offset space.

11. The system of claim 10, wherein at least part of the connection/disconnection unit is disposed near to one speed changer of the first and second speed changers within the offset space, and
wherein at least part of the volumetric capacity chamber is disposed near to the other speed changer of the first and second speed changers within the offset space.

12. The system of claim 10, wherein the first and second speed changers are planetary gear type speed changers which are each made up of the three rotational elements,
wherein the motor is connected to second rotational elements, and
wherein the wheel is connected to third rotational elements.

13. The system of claim 12, wherein in the planetary gear type speed changers, the first rotational elements are made up of ring gears, the second rotational elements are made up of sun gears, and the third rotational elements are made up of carriers.

14. The system of claim 13, wherein the carriers each support a double pinion that is made up of a large-diameter pinion that meshes with the sun gear and a small-diameter pinion that is smaller in diameter than the large-diameter pinion and which meshes with the ring gear, and
wherein the connection/disconnection unit is disposed radially outwards of the ring gear.

15. The system of claim 13, wherein the connection/disconnection unit has a fixed plate that is fixed to the common case and a rotational plate that is fixed to the ring gear so as to rotate together with the ring gear, whereby the ring gear is fixed to the common case or the ring gear is released from the common case by frictionally engaging or releasing both the plates with or from each other.

16. The system of claim 10, further including:
a one-way power-transmitting unit that is provided in parallel with the connection/disconnection unit and which is configured so that the one-way power-transmitting unit is put in an engaged state when a forward rotational power on the motor side is inputted into the wheel side and is put in a disengaged state when a backward rotational power on the motor side is inputted into the wheel side, while the one-way power-transmitting unit is put in the disengaged state when a forward rotational power on the wheel side is inputted into the motor side and is put in the engaged state when a backward rotational power on the wheel side is inputted into the motor side,
wherein the one-way power-transmitting unit is disposed on the first rotational elements coupled thereto.

17. The system of claim 1, further including:
a one-way power-transmitting unit that is configured so that the one-way power-transmitting unit is put in an engaged state when a forward rotational power on a motor side is inputted into a wheel side and is put in a disengaged state when a backward rotational power on the motor side is inputted into the wheel side, while the one-way power-transmitting unit is put in the disengaged state when a forward rotational power on the wheel side is inputted into the motor side and is put in the engaged state when a backward rotational power on the wheel side is inputted into the motor side, wherein the first and second speed changers are each made up of three rotational elements, wherein first rotational elements of the three rotational elements of the first and second speed changers are coupled to each other, wherein the one-way power-transmitting unit is disposed on the first rotational elements coupled thereto, and wherein at least part of the one-way power-transmitting unit is disposed within the offset space.

18. The system of claim 17, wherein at least part of the one-way power-transmitting unit is disposed near to one speed changer of the first and second speed changers within the offset space, and wherein at least part of the volumetric capacity chamber is disposed near to the other speed changer of the first and second speed changers within the offset space.

19. The system of claim 17, wherein the first and second speed changers are planetary gear type speed changers which are each made up of the three rotational elements, wherein the motor is connected to second rotational elements, and wherein the wheel is connected to third rotational elements.

20. The system of claim 19, wherein in the planetary gear type speed changers, the first rotational elements are made up of ring gears, the second rotational elements are made up of sun gears, and the third rotational elements are made up of carriers.

21. The system of claim 20, wherein the carriers each support a double pinion that is made up of a large-diameter pinion that meshes with the sun gear and a small-diameter pinion that is smaller in diameter than the large-diameter pinion and which meshes with the ring gear, and wherein the one-way power-transmitting unit is disposed radially outwards of the ring gear.

22. The system of claim 1, wherein at least one of the radially outer edge of the rotational element of the first speed changer and the radially outer edge of the rotational element of the second speed changer is formed smaller in the radial distance than each of the radially outermost edge portion of the first motor and the radially outermost edge portion of the second motor.

23. The system of claim 1, wherein the first motor, the first speed changer, the second speed changer and the second motor are disposed sequentially in this order in the width direction of the vehicle, and wherein the offset space extends from the first speed changer to the second speed changer.

* * * * *